US012633065B2

(12) United States Patent
Araumi

(10) Patent No.: US 12,633,065 B2
(45) Date of Patent: May 19, 2026

(54) COMMUNICATION MANAGEMENT SERVER, COMMUNICATION SYSTEM, AND METHOD FOR MANAGING COMMUNICATION

(71) Applicant: Yuichi Araumi, Tokyo (JP)

(72) Inventor: Yuichi Araumi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 170 days.

(21) Appl. No.: 18/373,294

(22) Filed: Sep. 27, 2023

(65) Prior Publication Data

US 2024/0112422 A1 Apr. 4, 2024

(30) Foreign Application Priority Data

Sep. 30, 2022 (JP) ................................. 2022-158681
Jul. 19, 2023 (JP) ................................. 2023-117755

(51) Int. Cl.
*G06T 19/00* (2011.01)
*H04W 64/00* (2009.01)

(52) U.S. Cl.
CPC ......... *G06T 19/006* (2013.01); *H04W 64/003* (2013.01)

(58) Field of Classification Search
CPC ............................ G06T 19/006; H04W 64/003
USPC ........................................................ 345/633
See application file for complete search history.

(56) References Cited

U.S. PATENT DOCUMENTS

| 2011/0037712 | A1* | 2/2011 | Kim ....................... G06F 3/0488 |
| | | | 345/173 |
| 2012/0329527 | A1* | 12/2012 | Kang ................... H04N 21/472 |
| | | | 455/566 |
| 2014/0257525 | A1* | 9/2014 | Nagamatsu ........ H04N 21/4227 |
| | | | 700/28 |
| 2018/0204385 | A1* | 7/2018 | Sarangdhar ........... H04L 12/282 |

(Continued)

FOREIGN PATENT DOCUMENTS

| CN | 215447956 U | * | 8/2021 | ............. G01C 21/34 |
| JP | 2020-017829 A | | 1/2020 | |

OTHER PUBLICATIONS

U.S. Appl. No. 18/121,591, filed Mar. 15, 2023.

*Primary Examiner* — Jin Ge
(74) *Attorney, Agent, or Firm* — XSENSUS LLP

(57) ABSTRACT

A communication management server includes circuitry to receive, from a mobile device being movable in a real space and a first communication terminal, information indicating positions of the mobile device and the first communication terminal in the real space. The circuitry generates a virtual space image including an icon of the mobile device and an icon of the first communication terminal that are associated with corresponding positions in a virtual space to appear on the virtual space image based on the information received, and including an icon of a second communication terminal. The circuitry transmits the virtual space image to the second communication terminal and establishes voice communication between the first communication terminal and the second communication terminal in response to receiving, via the second communication terminal, an operation of associating the icon of the second communication terminal with the icon of the mobile device on the virtual space image.

19 Claims, 27 Drawing Sheets

(56) References Cited

U.S. PATENT DOCUMENTS

| 2018/0315133 A1* | 11/2018 | Brody .................... H04L 51/222 |
|---|---|---|
| 2020/0036892 A1 | 1/2020 | Araumi et al. |
| 2020/0394406 A1* | 12/2020 | Tsushima ................ G06F 3/011 |
| 2022/0078344 A1 | 3/2022 | Araumi et al. |
| 2022/0124286 A1* | 4/2022 | Punwani ............. H04L 65/1069 |
| 2022/0152836 A1* | 5/2022 | Ueyama ................. B25J 9/1697 |
| 2022/0345666 A1* | 10/2022 | Jung .................... H04L 12/1831 |
| 2024/0303898 A1* | 9/2024 | Nagahara .............. G06Q 50/01 |

* cited by examiner

| CPU | ROM | RAM | SSD | DISPLAY |

310

| NETWORK I/F | KEYBOARD | POINTING DEVICE | MEDIUM I/F |

306    311    312    307

MEDIUM

308

FIG. 8A
FIG. 8B
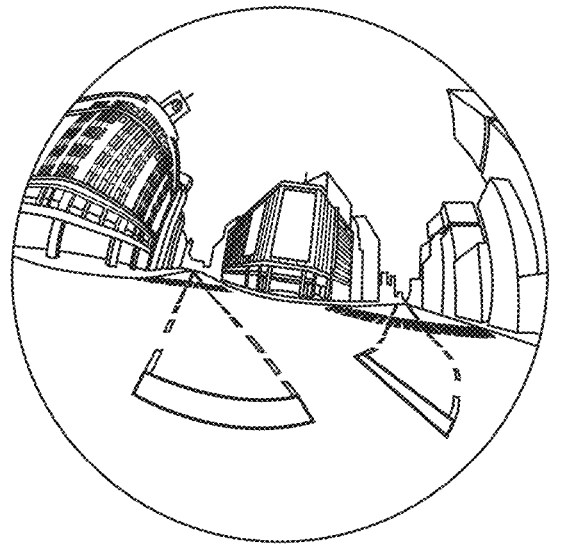
HEMISPHERICAL IMAGE (FRONT)
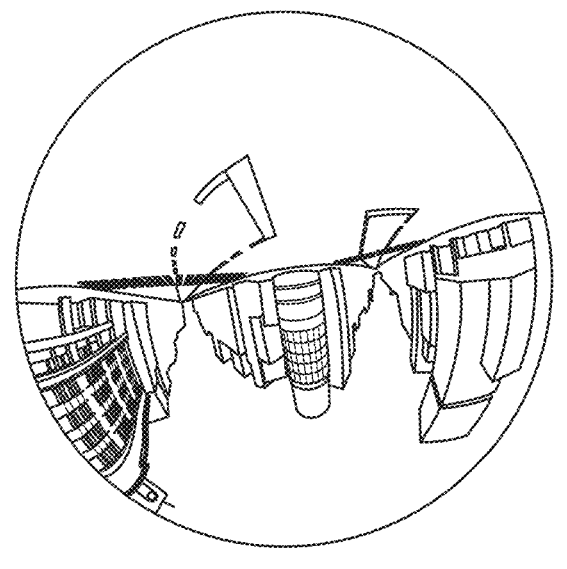
HEMISPHERICAL IMAGE (BACK)
FIG. 8C
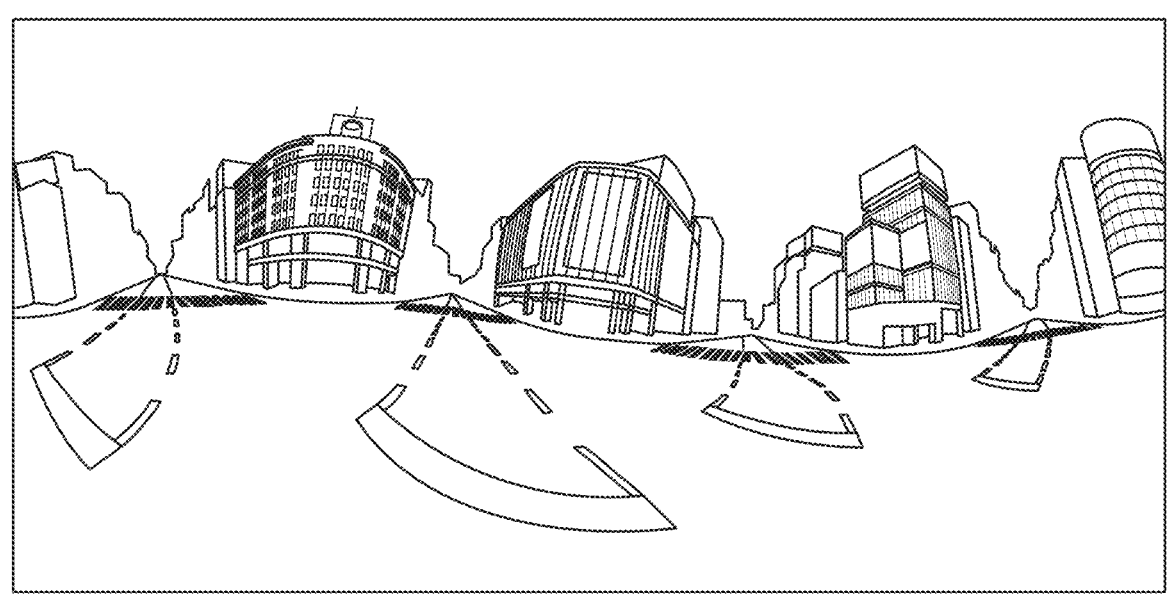
CAPTURED IMAGE (EQUIRECTANGULAR PROJECTION IMAGE EC)

EQUIRECTANGULAR PROJECTION IMAGE EC

SPHERICAL IMAGE CE

VIRTUAL CAMERA IC
SPHERE CS

PREDETERMINED–AREA IMAGE Q
(PREDETERMINED AREA T)

VIRTUAL CAMERA IC
SPHERE CS

PREDETERMINED–AREA IMAGE Q'
(PREDETERMINED AREA T')

FIG. 15

| NAME | LOGIN ID | PASSWORD | ICON ID | ICON IMAGE | REAL SPACE POSITION INFORMATION | VIRTUAL SPACE POSITION INFORMATION | BELONGING DESTINATION | DEDICATED VOICE COMMUNICATION COUNTERPART |
|---|---|---|---|---|---|---|---|---|
| EXPLAINER E1 | L11 | pw11 | e11 | | (X11, Y11) | (x11, y11) | r21 | y21 |
| EXPLAINER E2 | L12 | pw12 | e12 | | (X12, Y12) | (x12, y12) | r22 | |
| USER Y1 | L21 | pw21 | y21 | | - | (x21, y21) | r21(→r22) | e11 |
| USER Y2 | L22 | pw22 | y22 | | - | (x22, y22) | r21 | |
| USER Y3 | L23 | pw23 | y23 | | - | (x23, y23) | r22 | |
| ROBOT R1 | L31 | pw31 | r21 | | (X31, Y31) | (x31, y31) | - | - |
| ROBOT R2 | L32 | pw32 | r22 | | (X32, Y32) | (x32, y32) | - | - |

VIRTUAL SPACE IMAGE

FIG. 19

VIRTUAL SPACE IMAGE

FIG. 25

COMMUNICATION MANAGEMENT SERVER, COMMUNICATION SYSTEM, AND METHOD FOR MANAGING COMMUNICATION

CROSS-REFERENCE TO RELATED APPLICATIONS

This patent application is based on and claims priority pursuant to 35 U.S.C. § 119(a) to Japanese Patent Application Nos. 2022-158681, filed on Sep. 30, 2022, and 2023-117755, filed on Jul. 19, 2023, in the Japan Patent Office, the entire disclosure of which is hereby incorporated by reference herein.

BACKGROUND

Technical Field

The present disclosure relates to a communication management server, a communication system, and a method for managing communication.

Related Art

In an exhibition in a real space, there is a tour in which an explainer tours the exhibition together with a telepresence robot. The telepresence robot is referred to as a robot in the following. For example, in the related art, a user who desires to observe an exhibition remotely can observe the exhibition from a remote site by viewing a video from a camera mounted on a robot or listening to the voice of an explainer from a microphone mounted on the robot, with his or her personal computer (PC).

SUMMARY

According to an embodiment of the present disclosure, a communication management server includes circuitry to receive, from a mobile device, real space device position information indicating a position of the mobile device in a real space. The mobile device is movable in the real space and available to capture an image. The circuitry receives, from a first communication terminal being present in the real space, real space terminal position information indicating a position of the first communication terminal in the real space. The circuitry generates a virtual space image representing a virtual space. The virtual space image includes an icon related to the mobile device, an icon related to the first communication terminal, and an icon related to a second communication terminal. Each of the icon related to the mobile device and the icon related to the first communication terminal is associated with a corresponding position in the virtual space to appear on the virtual space image based on a corresponding one of the real space device position information and the real space terminal position information. The circuitry transmits the virtual space image to the second communication terminal and establishes voice communication between the first communication terminal and the second communication terminal in response to receiving, via the second communication terminal, an operation of associating the icon related to the second communication terminal with the icon related to the mobile device on the virtual space image.

According to an embodiment of the present disclosure, a communication system includes the above-described communication management server and a mobile device movable in the real space and available to capture an image. The mobile device transmits, to the communication management server, the real space device position information.

According to an embodiment of the present disclosure, a communication management server includes circuitry to generate a virtual space image representing a virtual space. The virtual space image includes a first icon related to a first mobile device, a second icon related to a second mobile device, a third icon related to a first communication terminal, a fourth icon related to a second communication terminal, and an additional icon related to an additional communication terminal. Each of the first icon, the second icon, the third icon, and the fourth icon is associated with a position in the virtual space to appear on the virtual space image according to a position of a corresponding one of the first mobile device, second mobile device, third communication terminal, and the fourth communication terminal in a real space. Each of the first mobile device and the second mobile device is movable in the real space and available to capture an image. The circuitry establishes voice communication between the first communication terminal and the additional communication terminal, transmits the virtual space image to the additional communication terminal, and disconnects the voice communication between the first communication terminal and the additional communication terminal to establish different voice communication between the second communication terminal and the additional communication terminal in response to receiving, via the additional communication terminal, an operation of changing association of the additional icon from the first icon to the second icon on the virtual space image.

According to an embodiment of the present disclosure, a communication system includes the above-described communication management server, a first mobile device movable in the real space and available to capture an image, and a second mobile device movable in the real space and available to capture an image. The second mobile device is different from the first mobile device.

According to an embodiment of the present disclosure, a method for managing communication includes receiving, from a mobile device, real space device position information indicating a position of the mobile device in a real space. The mobile device is movable in the real space and available to capture an image. The method includes receiving, from a first communication terminal being present in the real space, real space terminal position information indicating a position of the first communication terminal in the real space. The method includes generating a virtual space image representing a virtual space. The virtual space image includes an icon related to the mobile device, an icon related to the first communication terminal, and an icon related to a second communication terminal. Each of the icon related to the mobile device and the icon related to the first communication terminal is associated with a corresponding position in the virtual space to appear on the virtual space image based on a corresponding one of the real space device position information and the real space terminal position information. The method includes transmitting the virtual space image to the second communication terminal and establishing voice communication between the first communication terminal and the second communication terminal in response to receiving, via the second communication terminal, an operation of associating the icon related to the second communication terminal with the icon related to the mobile device on the virtual space image.

According to an embodiment of the present disclosure, a method for managing communication includes generating a virtual space image representing a virtual space. The virtual space image includes a first icon related to a first mobile device, a second icon related to a second mobile device, a third icon related to a first communication terminal, a fourth icon related to a second communication terminal, and an additional icon related to an additional communication terminal. Each of the first icon, the second icon, the third icon, and the fourth icon is associated with a position in the virtual space to appear on the virtual space image according to a position of each of the first mobile device, second mobile device, third communication terminal, and the fourth communication terminal in a real space. Each of the first mobile device and the second mobile device is movable in the real space and available to capture an image. The method includes establishing voice communication between the first communication terminal and the additional communication terminal, transmitting the virtual space image to the additional communication terminal, and disconnecting the voice communication between the first communication terminal and the additional communication terminal to establish different voice communication between the second communication terminal and the additional communication terminal in response to receiving, via the additional communication terminal, an operation of changing association of the additional icon from the first icon to the second icon on the virtual space image.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 3 is a block diagram illustrating a hardware configuration of a communication management server according to the exemplary embodiment of the disclosure;

FIGS. 8A to 8C are diagrams illustrating an overview of a process of generating an equidistant cylindrical projection image and a spherical image from images captured by the wide-angle imaging device according to the exemplary embodiment of the disclosure;

FIGS. 1A and 1C are perspective views of FIG. 10.

FIG. 15 is a conceptual diagram illustrating a position information management table, according to the exemplary embodiment of the disclosure;

FIG. 17 is a sequence diagram illustrating a process of displaying a virtual space image, establishing voice communication, and establishing video communication, according to the exemplary embodiment of the disclosure:

FIG. 18 is a diagram illustrating a virtual space image on which an initial position of an icon of a user is indicated, according to the exemplary embodiment of the disclosure;

FIG. 19 is a diagram illustrating a virtual space image after the icon of the user is moved in order to associate the icon with another icon of a robot, according to the exemplary embodiment of the disclosure;

FIG. 25 is a sequence diagram illustrating a process for performing dedicated voice communication, according to the exemplary embodiment of the disclosure;

Figure 1:
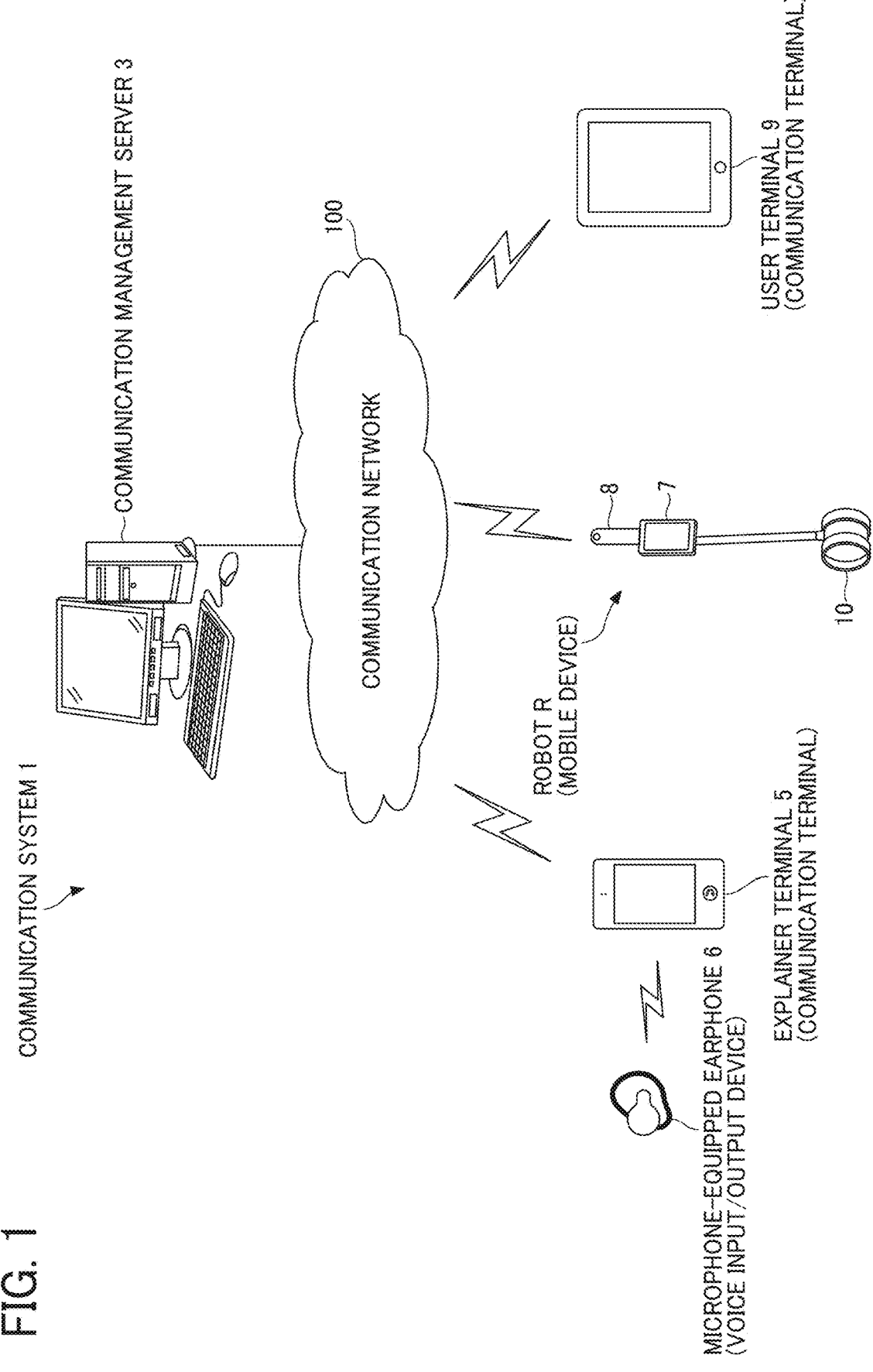
FIG. 1 is a diagram illustrating an overall configuration of a communication system using a telepresence robot R (in the specification, the telepresence robot R is also referred to as a "robot R") according to an exemplary embodiment of the disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Overview of Communication System

An overview of a communication system 1 according to a present embodiment is described with reference to FIG. 1. FIG. 1 is a diagram illustrating an overall configuration of a communication system using a telepresence robot R (in the following description of the present embodiment, the telepresence robot R is referred to as a "robot R").

The communication system 1 includes a communication management server 3, an explainer terminal 5, a microphone-equipped earphone 6, a user terminal 9, and the robot R.

The robot R includes a robot terminal 7, a wide-angle imaging device 8, and a vehicle device 10 for allowing the robot R to move. The robot R according to the present embodiment autonomously travels. In some embodiments, the robot R does not autonomously travel. The robot R is an example of a mobile device, and the mobile apparatus includes a device that moves in the air, such as a drone, and a device that moves in water, such as a submarine-type radio control device. The vehicle device 10 is an example of a propulsion device. The robot R is provided with an environmental sensor such as a temperature sensor, a humidity sensor, an oxygen sensor, or a carbon dioxide sensor, and is also provided with a lighting device for illuminating the surroundings of the robot R. An explainer E1 or E2 is an example of an "explainer E," a user Y1, Y2, or Y3 is an example of a "user Y," and a robot R1 or R2 is an example of the "robot R." In addition, an explainer terminal 5a or 5b is an example of the "explainer terminal 5," a microphone-equipped earphone 6a or 6b is an example of the "microphone-equipped earphone 6," a robot terminal 7a or 7b is an example of the "robot terminal 7," and a user terminal 9a, 9b, or 9c is an example of the "user terminal 9." A wide-angle imaging device 8a or 8b is an example of the "wide-angle imaging device 8," and a vehicle device 10a or 10b is an example of the "vehicle device 10."

The communication management server 3, the explainer terminal 5, the user terminal 9, and the robot terminal 7 of the robot R can communicate with each other via a communication network 100 such as the Internet. The communication may be wired communication or wireless communication. In the example of FIG. 1, the explainer terminal 5, the user terminal 9, and the robot terminal 7 are illustrated to communicate wirelessly. The microphone-equipped earphone 6 can perform short-range communication by pairing with the explainer terminal 5.

Each of the explainer terminal 5 and the user terminal 9 is an example of a communication terminal.

Situation of Real Space

Figure 2:
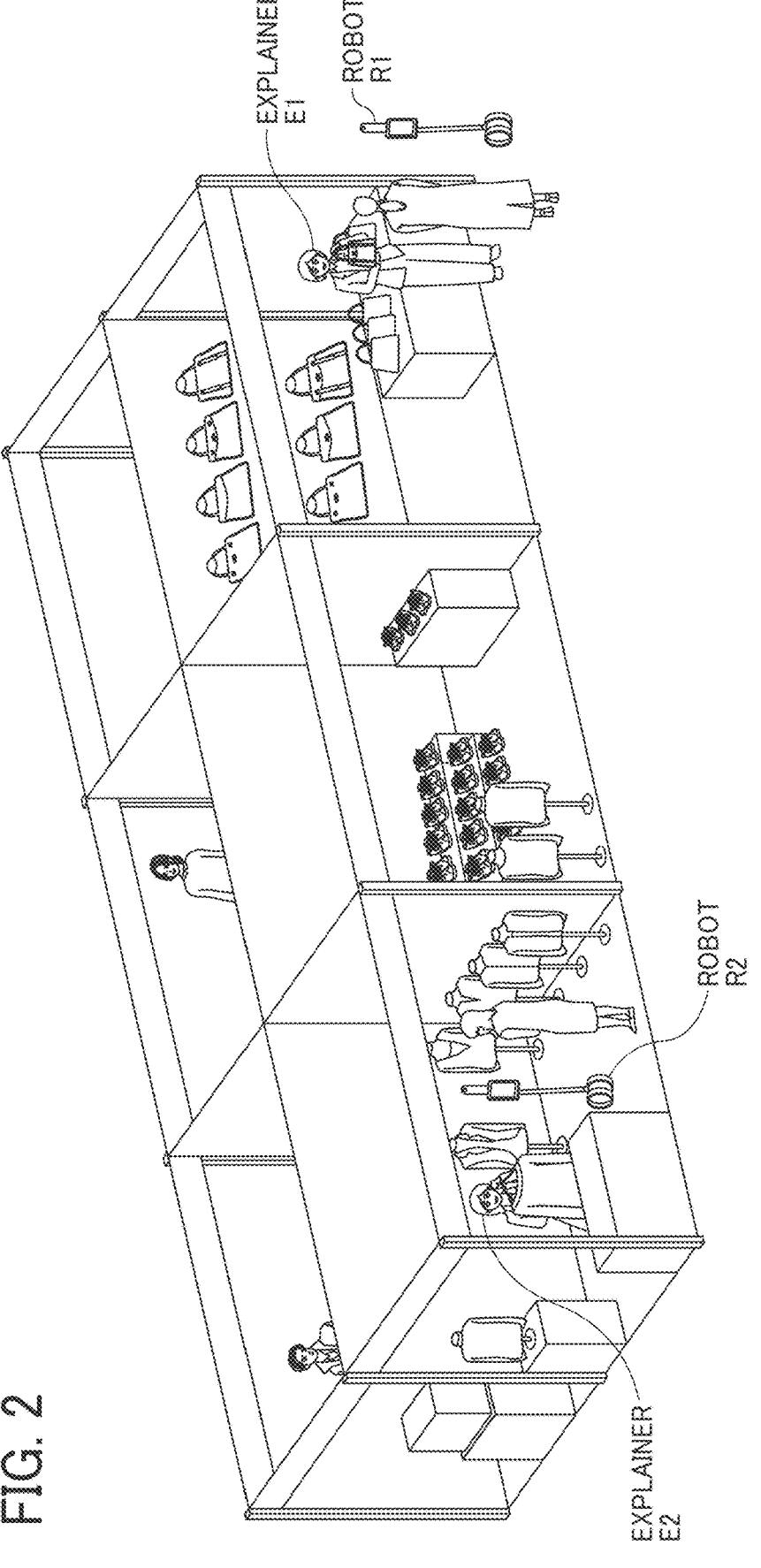
FIG. 2 is a diagram illustrating a situation of an exhibition in a real space according to the exemplary embodiment of the disclosure.

A situation of a real space is described with reference to FIG. 2. FIG. 2 is a diagram illustrating a situation of an exhibition in a real space according to the present embodiment. FIG. 2 illustrates an exhibition, but the present disclosure is not limited to this.

As illustrated in FIG. 2, at the exhibition, the robot R1 captures an image of the explainer E1 and the surroundings w % bile moving to follow the explainer E1. Similarly, the robot R2 captures an image of the explainer E2 and the surroundings while moving to follow the explainer E2.

The explainer E1 is with the explainer terminal 5a and can operate the explainer terminal 5a at any time. Similarly, the explainer E2 is with the explainer terminal 5b and can operate the explainer terminal 5b at any time. The explainers E1 and E2 are examples of the explainer E. The explainer terminals 5a and 5b are examples of the explainer terminal 5 illustrated in FIG. 1.

The robot R1 includes the robot terminal 7a, the wide-angle imaging device 8a, and the vehicle device 10a, and the robot R2 includes the robot terminal 7b, the wide-angle imaging device 8b, and the vehicle device 10b. The robot terminals 7a and 7b are examples of the robot terminal 7 illustrated in FIG. 1. The wide-angle imaging devices 8a and 8b are examples of the wide-angle imaging device 8 illustrated in FIG. 1. The vehicle devices 10a and 10b are examples of the vehicle device 10 illustrated in FIG. 1.

Hardware Configuration

A hardware configuration of each of a server and a terminal included in the communication system 1 is described below, with reference to FIGS. 3 to 13.

Hardware Configuration of Communication System

Figure 3:
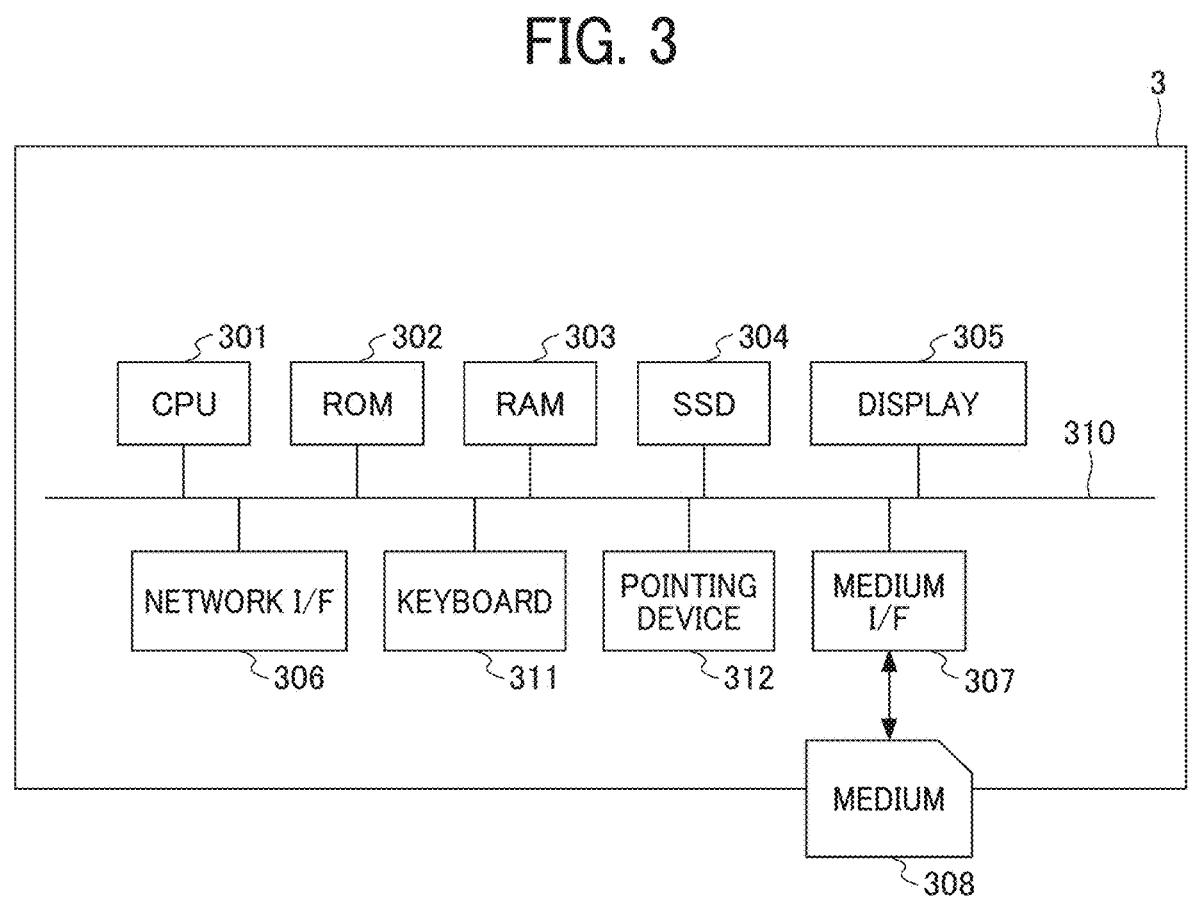

FIG. 3 is a block diagram illustrating a hardware configuration of a communication management server according to the present embodiment.

As illustrated in FIG. 3, the communication management server 3 has a configuration of a general-purpose computer, and includes, for example, a central processing unit (CPU) 301, a read only memory (ROM) 302, a random access memory (RAM) 303, a solid-state drive (SSD) 304, and a display 305. The communication management server 3 further includes a network interface (I/F) 306, a keyboard 311, a pointing device 312, a medium/F 307, and a bus 310. In alternative to the SSD, a hard disk drive (HDD) may be used.

The CPU 301 is, for example, an arithmetic device that reads out programs or data from the ROM 302 or the SSD 304, and executes processing according to the programs or data to implement functions of the communication management server 3. The ROM 302 is a nonvolatile memory in which a program used for starting the CPU 301 such as an initial program loader (IPL) is stored in advance. The RAM 303 is a volatile memory used as a work area of the CPU 301.

The SSD 344 is a storage device that stores, for example, an operating system (OS), application programs, and various types of information. The display 305 is a display device that displays various types of information such as a cursor, a menu, a window, characters, or an image.

The network I/F 306 is a communication interface for performing data transmission using the communication network 100. The keyboard 311 is one example of an input device that receives inputs such as characters, numerical values, or various instructions according to an operation performed by a system administrator, for example. The pointing device 312 receives inputs such as selection or execution of various instructions, selection for processing, and movement of a cursor according to an operation performed by the system administrator, for example. The pointing device 312 may be a mouse.

The medium I/F 307 controls, for example, reading and writing (storing) data from or to a recording medium 308 such as a memory card. The bus 310 electrically connects the above-described hardware components to each other and transfers address signals, data signals, or various control signals.

Hardware of Explainer Terminal, Robot Terminal, and User Terminal

Figure 4:
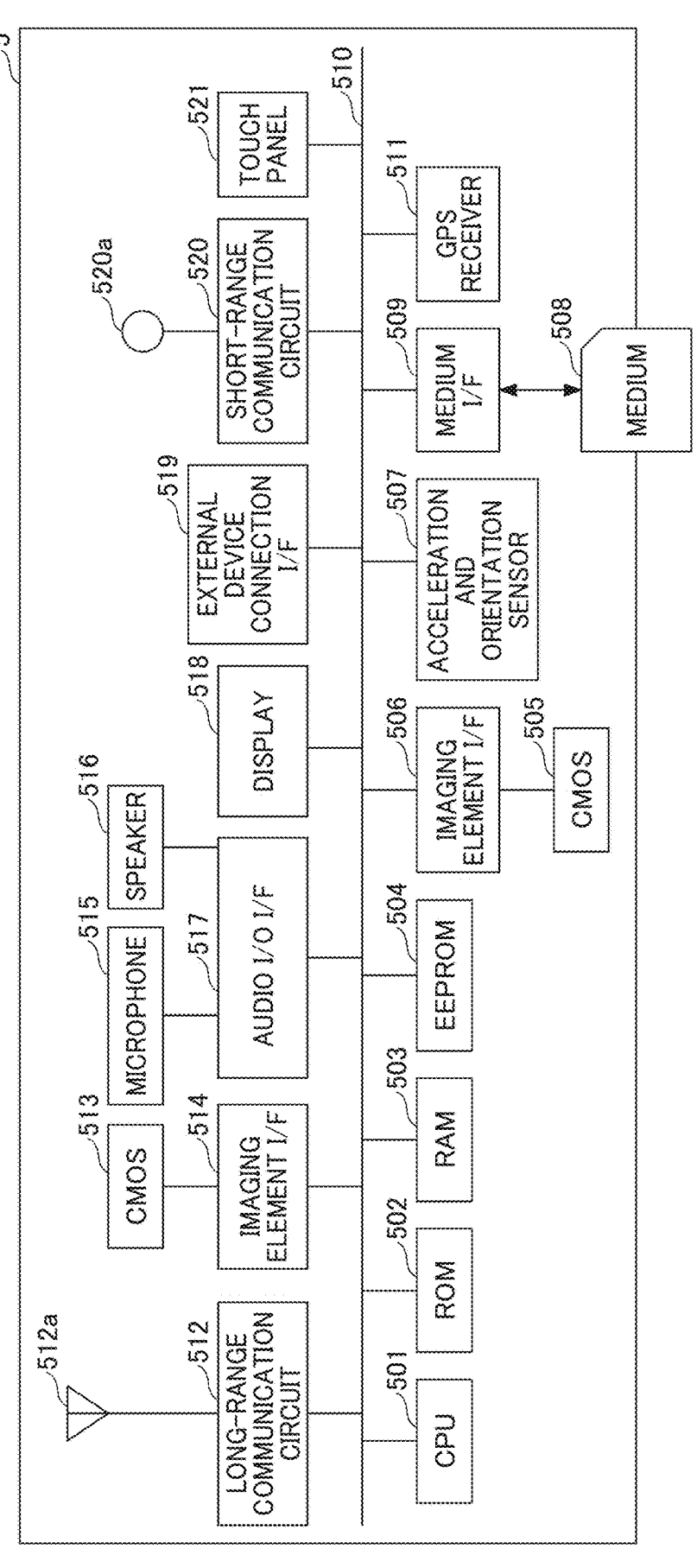
FIG. 4 is a block diagram illustrating a hardware configuration of each of an explainer terminal, a robot terminal, and a user terminal according to the exemplary embodiment of the disclosure.

FIG. 4 is a block diagram illustrating a hardware configuration of each of an explainer terminal, a robot terminal, and a user terminal according to the present embodiment.

As illustrated in FIG. 4, the explainer terminal 5 includes a CPU 501, a ROM 502, a RAM 503, an electrically erasable programmable read-only memory (EEPROM) 504, a complementary metal oxide semiconductor (CMOS) sensor 505, an imaging element I/F 506, an acceleration and orientation sensor 507, a medium I/F 509, and a global positioning system (GPS) receiver 511.

The CPU 501 controls the entire operation of the explainer terminal 5. The ROM 502 stores programs, such as an IPL, used for driving the CPU 501. The RAM 503 is used as a work area for the CPU 501. The EEPROM 504 reads or writes various data such as a control program for explainer terminals under the control of the CPU 501. The CMOS sensor 505 is an example of a built-in imaging device that captures an object (for example, a self-image of a user) under the control of the CPU 501 and obtains image data. In alternative to the CMOS sensor 505, an imaging element such as a charge-coupled device (CCD) sensor may be used. The imaging element I/F 506 is a circuit that controls driving of the CMOS sensor 505. The acceleration and orientation sensor 507 includes various sensors such as, for example, an electromagnetic compass for detecting geomagnetism, a gyrocompass, and an acceleration sensor. The medium I/F 509, for example, reading and writing (storing) data from or to a recording medium 508 such as a flash memory. The GPS receiver 511 receives a GPS signal from a GPS satellite. The GPS receiver 511 can also receive a signal, such as an indoor messaging system (IMES), indicating an indoor position.

The explainer terminal 5 further includes a long-range communication circuit 512, a CMOS sensor 513, an imaging element I/F 514, a microphone 515, a speaker 516, an audio input and output (I/O) I/F 517, a display 518, an external device connection I/F 519, a short-range communication circuit 520, an antenna 520a for the short-range communication circuit 520, and a touch panel 521.

The long-range communication circuit 512 is a circuit to communicate with other devices through the communication network 100. The CMOS sensor 513 is an example of a built-in imaging device that captures an object under the control of the CPU 501 and obtains image data. The imaging element I/F 514 is a circuit that controls driving of the CMOS sensor 513. The microphone 515 is a built-in circuit that converts sound into electric signals. The speaker 516 is a built-in circuit that generates sound such as music or voice by converting an electric signal into physical vibration. The audio I/O I/F 517 is a circuit for inputting or outputting audio signals between the microphone 515 and the speaker 516 under the control of the CPU 501. The display 518 is an example of a display device that displays an image of an object, various icons, etc. Examples of the display 518 include, but are not limited to, a liquid crystal display (LCD) and an organic electroluminescence (EL) display. The external device connection I/F 519 is an interface for connecting to various external devices. The short-range communication circuit 520 is a communication circuit that communicates in compliance with a near field communication (NFC) or BLUETOOTH, for example. The touch panel 521 is one example of an input device that allows a user to operate the explainer terminal 5 by touching a screen of the display 518.

The explainer terminal 5 also includes a bus line 510. The bus line 510 includes an address bus and a data bus and electrically connects the components illustrated in FIG. 4, such as the CPU 401, to each other.

Since each of the robot terminal 7 and the user terminal 9 has the same configuration as that of the explainer terminal 5, the redundant description is omitted.

Hardware Configuration of Microphone-Equipped Earphone

Figure 5:
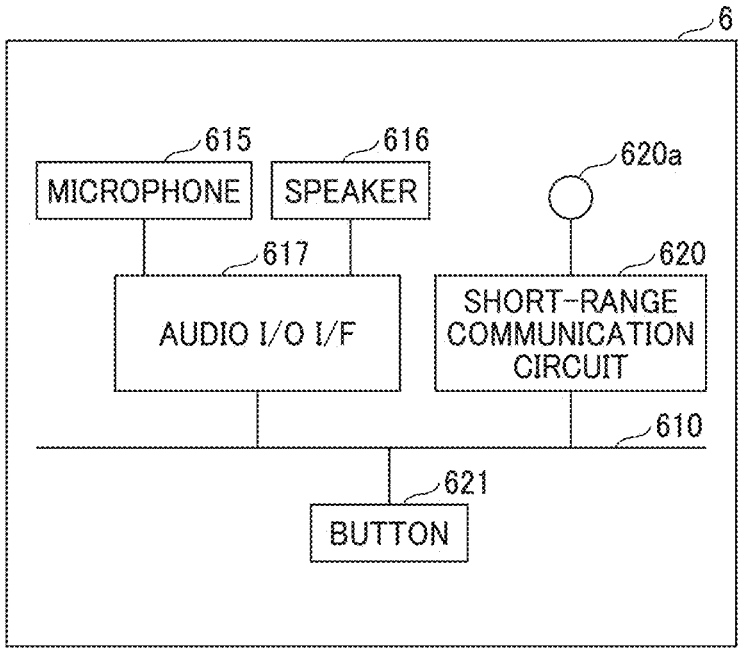
FIG. 5 is a block diagram illustrating a hardware configuration of a microphone-equipped earphone according to the exemplary embodiment of the disclosure.

FIG. 5 is a block diagram illustrating a hardware configuration of a microphone-equipped earphone according to the present embodiment.

As illustrated in FIG. 5, the microphone-equipped earphone 6 includes a microphone 615, a speaker 616, an audio I/O I/F 617, a short-range communication circuit 620, an antenna 620a of the short-range communication circuit 520, and a button 621.

The microphone 615 is a built-in circuit that converts sound into an electric signal. The speaker 616 is a built-in circuit that generates sound such as music or voice by converting an electric signal into physical vibration. The audio I/O I/F 617 is a circuit that processes input and output of audio signals between the microphone 615 and the speaker 616. The short-range communication circuit 620 is a communication circuit that communicates in compliance with an NFC or BLUETOOTH, for example. The button 621 is a type of operation devices that allows a user to operate the microphone-equipped earphone 6.

Hardware Configuration of Wide-Angle Imaging Device

Figure 6:
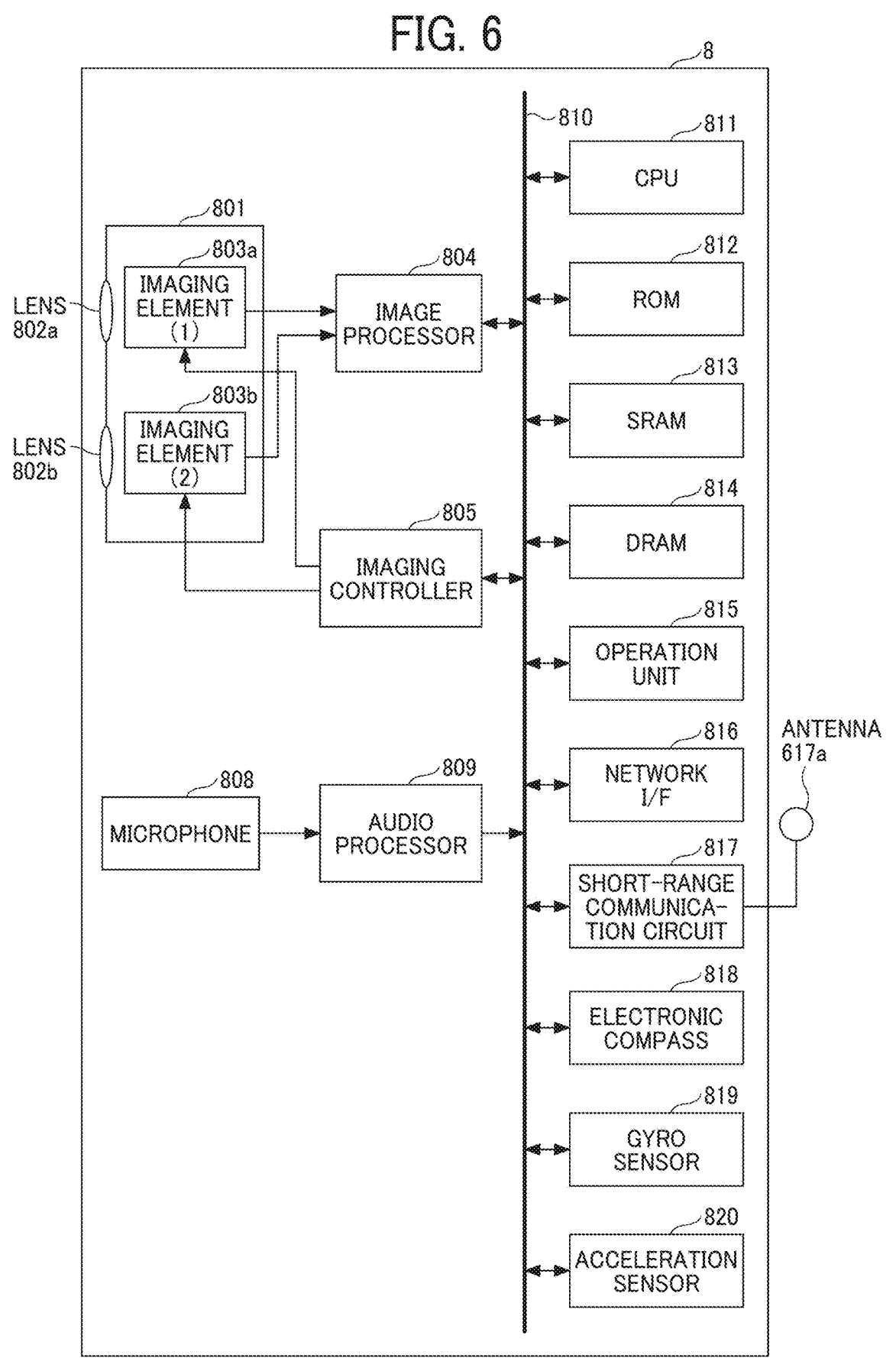
FIG. 6 is a block diagram illustrating a hardware configuration of a wide-angle imaging device according to the exemplary embodiment of the disclosure.

Referring to FIG. 6, a hardware configuration of the wide-angle imaging device 8 is described. FIG. 6 is a block diagram illustrating an example of a hardware configuration of the wide-angle imaging device 8. In the following description of the present embodiment, the wide-angle imaging device 8 that is a spherical (omnidirectional) imaging device having two imaging elements is used. In some embodiments, the wide-angle imaging device 8 includes more than two imaging elements. In addition, the wide-angle imaging device 8 is not necessarily a device dedicated to omnidirectional imaging. Alternatively, an external omnidirectional imaging unit may be attached to a general-purpose digital camera or a smartphone to implement an imaging device having substantially the same function as that of the wide-angle imaging device 8 according to the present embodiment.

As illustrated in FIG. 6, the wide-angle imaging device 8 is also connected to an imaging unit 801, an image processor 804, an imaging controller 805, a microphone 808, an audio processor 809, a CPU 811, a ROM 812, a static random access memory (SRAM) 813, a dynamic random access memory (DRAM) 814, an operation unit 815, a network I/F 816, a short-range communication circuit 817, an antenna 817a for the short-range communication circuit 817, an electronic compass 818, a gyroscopic sensor (gyro sensor) 819, and an acceleration sensor 820.

The imaging unit 801 includes two wide-angle lenses (so-called fisheye lenses) 802a and 802b, each having an angle of view equal to or greater than 180 degrees to form a hemispherical image. The imaging unit 801 further includes two imaging elements 803a and 803b corresponding to the wide-angle lenses 802a and 802b respectively. Each of the imaging elements 803a and 803b includes an imaging sensor such as a CMOS sensor and a CCD sensor, a timing generation circuit, and a group of registers. The imaging sensor converts an optical image formed by the fisheye lenses 802a and 802b into electric signals to output image data. The timing generation circuit generates horizontal or vertical synchronization signals and pixel clocks for the imaging sensor. Various commands and parameters for operations of the imaging elements 803a and 803b are set in the group of registers.

Each of the imaging elements 803a and 803b of the imaging unit 801 is connected to the image processor 804 through a parallel I/F bus. In addition, each of the imaging elements 803a and 803b of the imaging unit 801 is connected to the image controller 805 through a serial I/F bus such as an inter-integrated circuit (I2C) bus. The image processor 804, the imaging controller 805, and the audio processor 809 are connected to the CPU 811 via a bus 810. Further, the ROM 812, the SRAM 813, the DRAM 814, the operation unit 815, the network I/F 816, the short-range communication circuit 817, and the electronic compass 818 are also connected to the bus 810.

The image processor 804 acquires image data from each of the imaging elements 803a and 803b via the parallel I/F bus and performs predetermined processing on each image data. Thereafter, the image processor 804 combines the image data to generate data of an equirectangular projection image as illustrated in FIG. 8C.

The image controller 805 functions as a master device while each of the imaging elements 803a and 803b functions as a slave device, and the image controller 805 sets commands in the group of registers of each of the imaging elements 803a and 803b through the I2C bus. The image controller 805 receives commands from the CPU 811. In addition, the image controller 805 obtains status data of the group of registers of each of the imaging elements 803a and 803b through the I2C bus and transmits the status data to the CPU 811.

The image controller 805 instructs the imaging elements 803a and 803b to output the image data at a time when a shutter button of the operation unit 815 is pressed. The wide-angle imaging device 8 may have a preview display function or a moving image display function. In the case of displaying a moving image, the image data is continuously output from the imaging elements 803a and 803b at a predetermined frame rate (frames per minute).

Furthermore, the image controller 805 operates in conjunction with the CPU 811 to synchronize the output timings of image data between the imaging elements 803a and 803b. In the present embodiment, the wide-angle imaging device 8 is not provided with a display. In some embodiments, the wide-angle imaging device 8 is provided with a display.

The microphone 808 converts recorded voice into voice data. The audio processor 809 obtains the voice data from the microphone 808 through an I/F bus and performs predetermined processing on the voice data.

The CPU 811 controls the entire operation of the wide-angle imaging device 8 and executes processing. The ROM 812 stores various programs to be executed by the CPU 811. Each of the SRAM 813 and the DRAM 814 operates as a work memory to store programs to be executed by the CPU

811 or data being currently processed. More specifically, in one example, the DRAM 814 stores image data currently processed by the image processor 804 and data of the equirectangular projection image on which processing has been performed.

The operation unit 815 collectively refers to various operation buttons such as a shutter button. An operator operates the operation unit 815 to input various imaging modes or imaging conditions.

The network I/F 816 collectively refers to an interface circuit such as a universal serial bus (USB) I/F that allows the wide-angle imaging device 8 to communicate with an external medium such as a secure digital (SD) card or an external personal computer. The network I/F 816 supports at least one of wired communication and wireless communication. The data of the equirectangular projection image stored in the DRAM 814 is recorded in an external medium via the network I/F 816 or is transmitted to an external terminal (apparatus) via the network I/F 816 as appropriate.

The short-range communication circuit 817 establishes communication with an external terminal (for example, the robot terminal 7) via the antenna 817a of the wide-angle imaging device 8 through a short-range wireless communication technology such as Wi-Fi, NFC, and BLUETOOTH (registered trademark). By the short-range communication circuit 817, the data of the equirectangular projection image can be transmitted to an external terminal.

The electronic compass 818 calculates the orientation of the wide-angle imaging device 8 from the earth's magnetism and outputs orientation information. The orientation information is an example of related information that is metadata described in compliance with Exchangeable image file format (Exif) and is used for image processing such as image correction performed on a captured image. The related information also includes data indicating a time (date) when an image is captured, and data indicating a size of image data (a data size of image data), for example.

The gyro sensor 819 detects a change in tilt of the wide-angle imaging device 8 (roll, pitch, yaw), for example, due to movement of the wide-angle imaging device 8. The change in tilt is one example of related information (metadata) described in compliance with Exif. The information is used for image processing such as image correction performed on a captured image.

The acceleration sensor 820 detects triaxial acceleration. The attitude (an angle with respect to the direction of gravity) of the wide-angle imaging device 8 is detected based on the detected acceleration. Having the gyro sensor 819 and the acceleration sensor 820, the wide-angle imaging device 8 can improve accuracy of image correction.

Spherical Video

Figure 7:
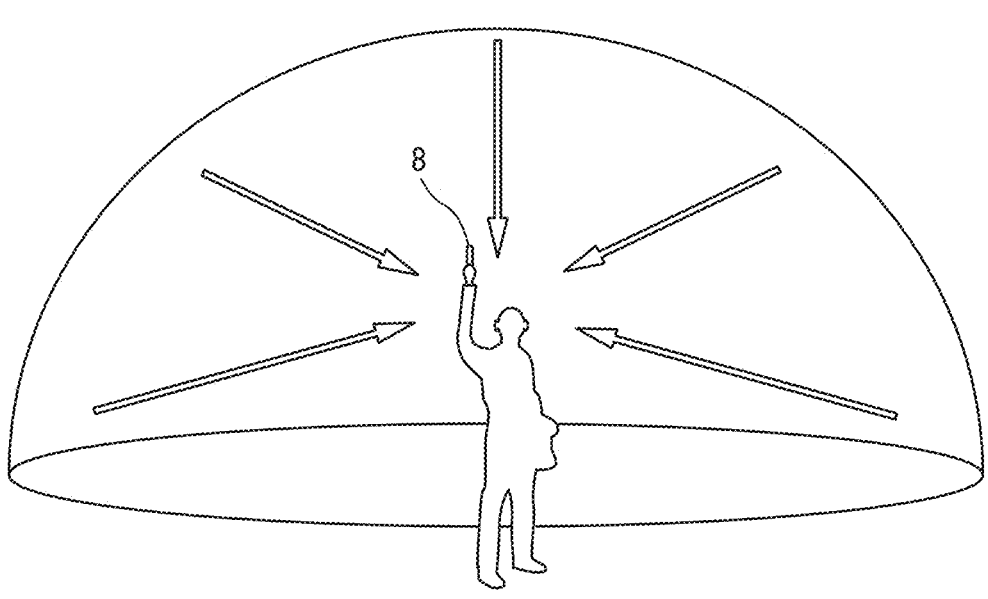
FIG. 7 is an illustration of an example of how a user uses the wide-angle imaging device according to the exemplary embodiment of the disclosure.

A situation in which the wide-angle imaging device 8 is used is described below with reference to FIG. 7. FIG. 7 is an illustration of an example of how a user uses the wide-angle imaging device 8 according to the present embodiment. As illustrated in FIG. 7, the wide-angle imaging device 8 is used for capturing objects surrounding the user who is holding the wide-angle imaging device 8 in his or her hand, for example. The imaging elements 803a and 803b illustrated in FIG. 6 capture the objects surrounding the user to obtain two hemispherical images.

Figures 9A, 9B:
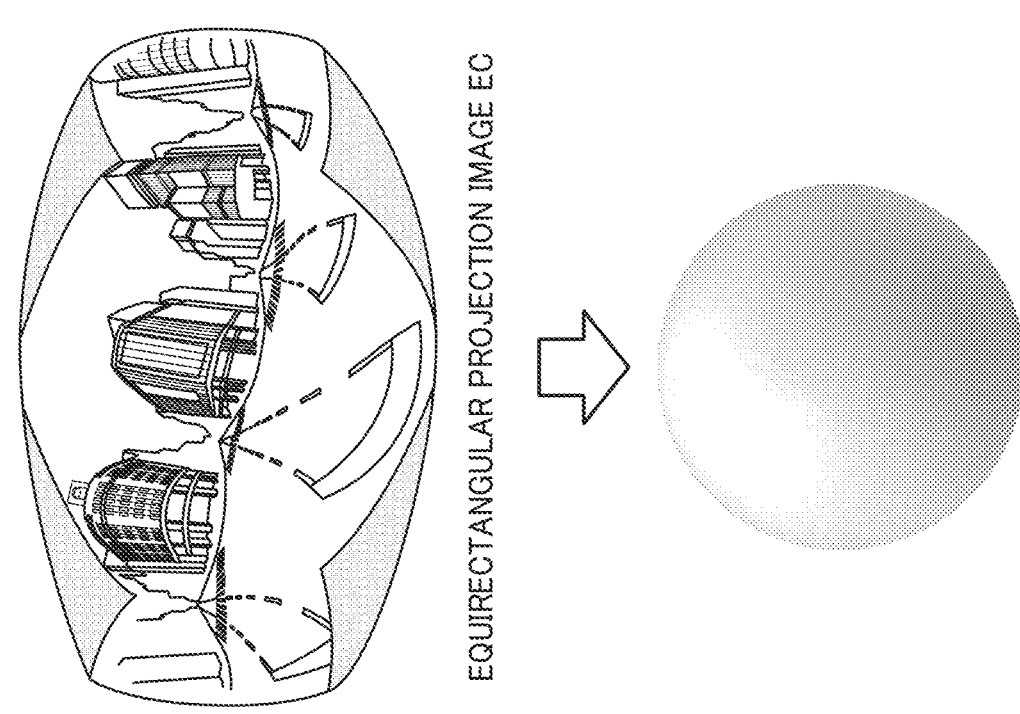
FIGS. 9A and 9B are diagrams illustrating an overview of a process of generating an equidistant cylindrical projection image and a spherical image from images captured by the wide-angle imaging device according to the exemplary embodiment of the disclosure.

A description is now given of an overview of a process of generating an equidistant cylindrical projection image and a spherical image from images captured by the wide-angle imaging device 8, with reference to FIG. 8 (FIG. 8A to FIG. 8C) and FIG. 9 (FIG. 9A and FIG. 9B). FIG. 8A is a diagram illustrating a hemispherical image (front side) captured by the wide-angle imaging device 8. FIG. 8B is a diagram illustrating a hemispherical image (back side) captured by the wide-angle imaging device 8. FIG. 8C is a diagram illustrating an image in equirectangular projection, which is referred to as an "equirectangular projection image" (or equidistant cylindrical projection image). FIG. 9A is a diagram illustrating an example of how an equirectangular projection image is mapped to a surface of a sphere. FIG. 9B is a diagram illustrating an example of a spherical image.

As illustrated in FIG. 8A, an image captured by the imaging element 803a is a curved hemispherical image (front side) due to the fisheye lens 802a, which is described later. In addition, as illustrated in FIG. 8B, an image captured by the imaging element 803b is a curved hemispherical image (back side) captured by the fisheye lens 802b, which is described later. The wide-angle imaging device 8 combines the hemispheric image (front side) and the hemispheric image (rear side) that is inverted by 180 degrees, to generate an equidistant cylindrical projection image EC as illustrated in FIG. 8C.

The equidistant cylindrical projection image is attached so as to cover the sphere surface using Open Graphics Library for Embedded Systems (OpenGL ES) as illustrated in FIG. 9A, and the spherical image as illustrated in FIG. 9B is generated, accordingly. In other words, the spherical image CE is represented as an image corresponding to the equirectangular projection image EC of which a surface faces toward the center of the sphere.

OpenGL ES is a graphic library used for visualizing two-dimensional (2D) data and three-dimensional (3D) data. The spherical image CE may be either a still image or a moving image.

As described above, since the spherical image CE is an image attached to the sphere surface to cover the sphere surface, a part of the image may look distorted when viewed by the user, giving a feeling of strangeness. To cope with this, the wide-angle imaging device 8 can display a predetermined area that is a part of the spherical image CE (such an image may be referred to as a predetermined-area image in the following description) as a planar image with little curvature, thus allowing display without giving a feeling of strangeness to the user. A description is now given of displaying the predetermined-area image, with reference to FIG. 10 and FIG. 11 (FIG. 11A to FIG. 11D). The predetermined-area image may be a moving image or a still image.

Figure 10:
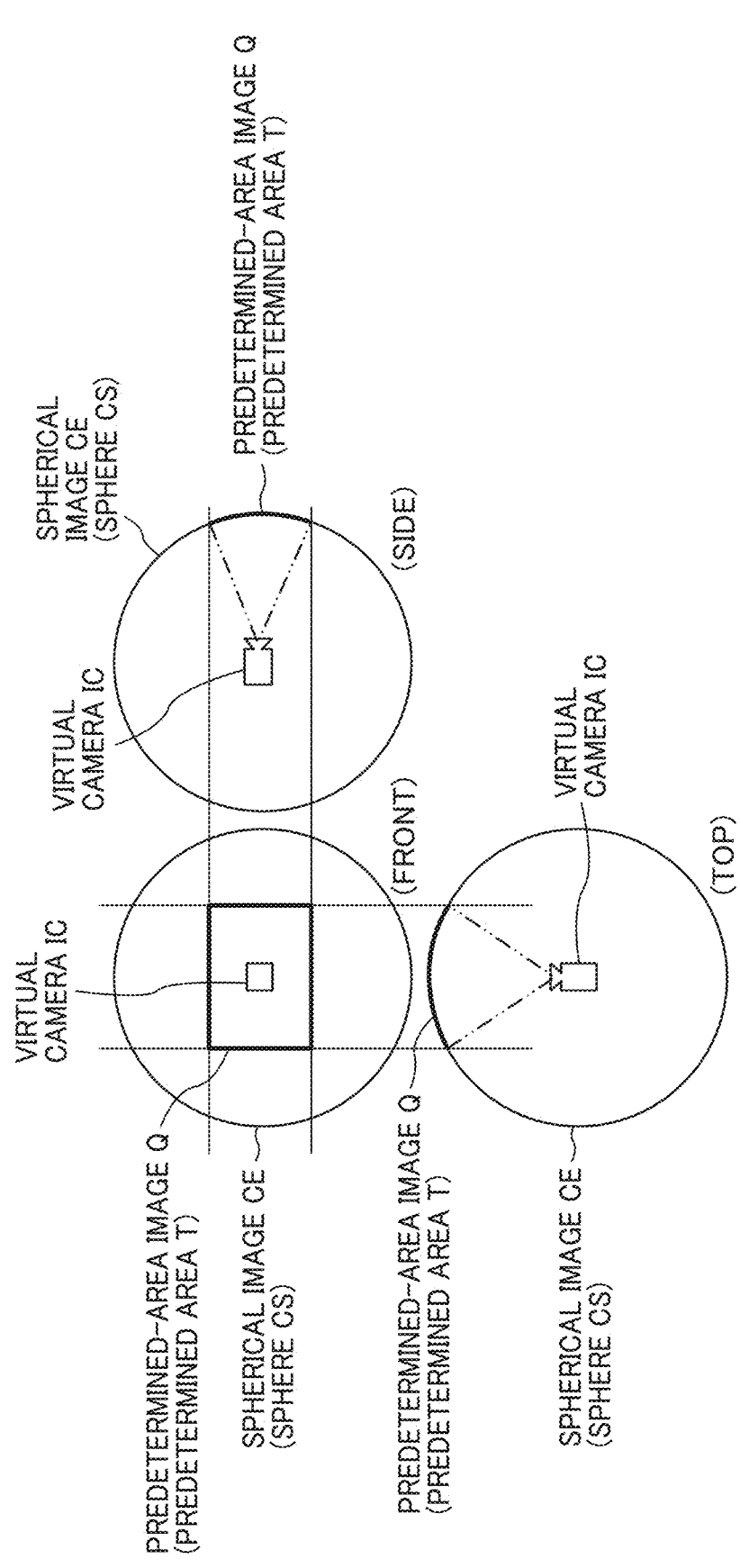
FIG. 10 is an illustration of relative positions of a virtual camera and a predetermined area in the case where a spherical image is represented as a surface area of a three-dimensional solid sphere, according to the exemplary embodiment of the disclosure.
Figure 11A:
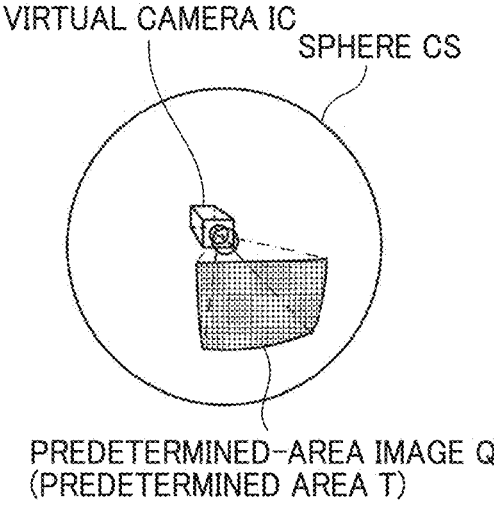
FIGS. 11B and 11D are views each illustrating a predetermined-area image displayed on a display, according to the exemplary embodiment of the disclosure.
Figure 11B:
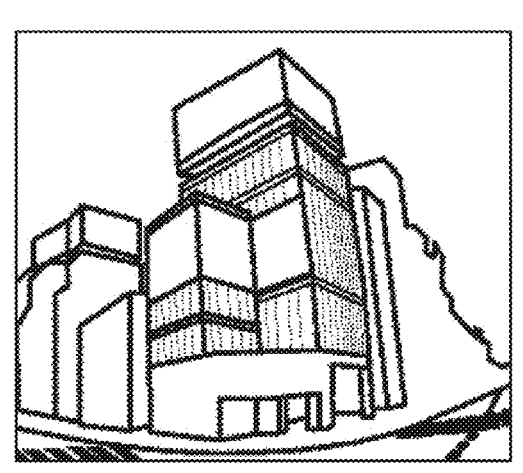

FIG. 10 is an illustration of relative positions of a virtual camera IC and a predetermined area T when the spherical image is represented as a three-dimensional solid sphere, according to the present embodiment. A virtual camera IC corresponds to a position of a point of view (viewpoint) of an operator who is viewing the spherical image CE represented as a surface area of the three-dimensional solid sphere. FIG. 11A is a perspective view of FIG. 10. FIG. 11B is a view illustrating the predetermined-area image displayed on a display. In FIG. 11A, the spherical image CE illustrated in FIG. 10 is represented as a surface area of the three-dimensional solid sphere CS. Assuming that the spherical image CE is a surface area of the solid sphere CS, the virtual camera IC is outside of the spherical image CE as illustrated in FIG. 11. The predetermined area T in the spherical image CE is an imaging area of the virtual camera IC. Specifically, the predetermined area T is specified by predetermined-area information indicating an imaging direction and an angle of view of the virtual camera IC in a three-dimensional virtual space containing the spherical image CE. In addition, zooming in the predetermined area T is also determined by bringing the virtual camera IC closer to or away from the spherical image CE. The predetermined-area image Q is an image of the predetermined area T in the spherical image CE. The predetermined area T is defined by an angle of view α and a distance f from the virtual camera IC to the spherical image CE (see FIG. 12).

The predetermined-area image Q, which is an image of the predetermined area T illustrated in FIG. 11A, is displayed on a predetermined display as an image of an imaging area of the virtual camera IC, as illustrated in FIG. 11B. The image illustrated in FIG. 11B is the predetermined-area image represented by the predetermined-area information that is set by default. In the following description of the present embodiment, an imaging direction (ea, aa) and the angle of view α of the virtual camera IC are used. In another example, the predetermined area T is identified by an imaging area (X, Y, Z) of the virtual camera IC, i.e., the predetermined area T, rather than the angle of view α and the distance f.

Figure 11C:
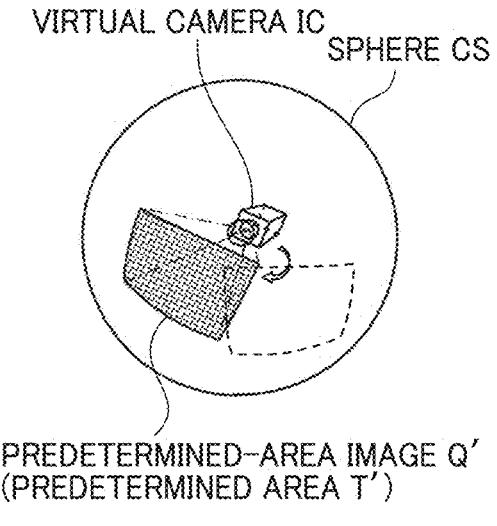
Figure 11D:
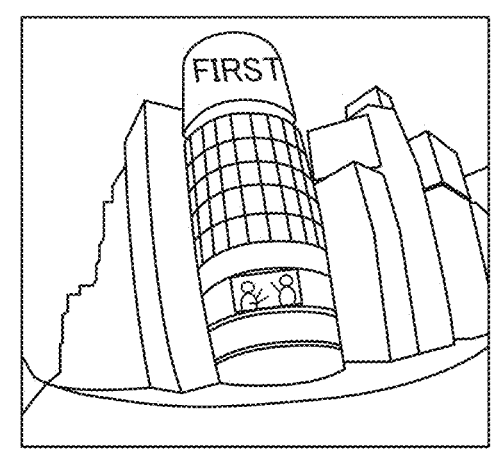

When the virtual viewpoint of the virtual camera IC is moved (changed) from the state illustrated in FIG. 11A to the right (left in the drawing) as illustrated in FIG. 11C, the predetermined area T in the spherical image CE is moved to a predetermined area T', accordingly. Accordingly, the predetermined-area image Q displayed on the predetermined display is changed to a predetermined-area image Q'. As a result, the image displayed on each display 518 of the explainer terminal 5 and the user terminal 9, which are transmission destinations, changes from the image illustrated in FIG. 11B to the image illustrated in FIG. 11D.

Figure 12:
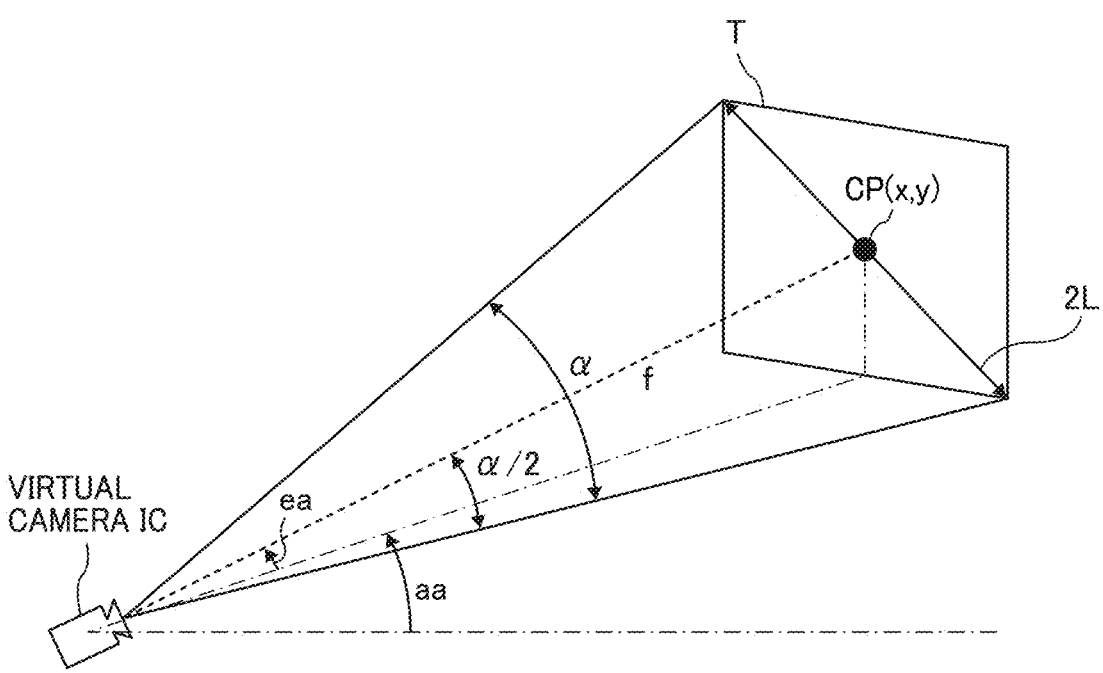
FIG. 12 is a view illustrating a relation between predetermined-area information and a predetermined area, according to the exemplary embodiment of the disclosure.

Referring to FIG. 12, a relation between the predetermined-area information and the image of the predetermined area T is described according to the present embodiment. FIG. 12 is a diagram illustrating a relation between the predetermined area information and the predetermined area T, according to the present embodiment. As illustrated in FIG. 12, "ea" denotes an elevation angle, "aa" denotes an azimuth angle, and "a" denotes an angle of view, respectively, of the virtual camera IC. The position of the virtual camera IC is adjusted, such that the point of gaze of the virtual camera IC, indicated by the imaging direction (ea, aa), matches a center point CP of the predetermined area T as the imaging area of the virtual camera IC. As illustrated in FIG. 12, when it is assumed that a diagonal angle of the viewable area T specified by the angle of view α of the virtual camera IC is a, the center point CP provides the parameters (x, y) of the viewable-area information. "f" denotes a distance from the virtual camera IC to the center point CP of the predetermined area T. "L" is a distance between the center point CP and a given vertex of the predetermined area T (2L is a diagonal line). In FIG. 12, a trigonometric function equation generally expressed by the following formula 1 is satisfied.

$$L/f = \tan(\alpha/2) \tag{Formula 1}$$

Hardware Configuration of Vehicle Device

Figure 13:
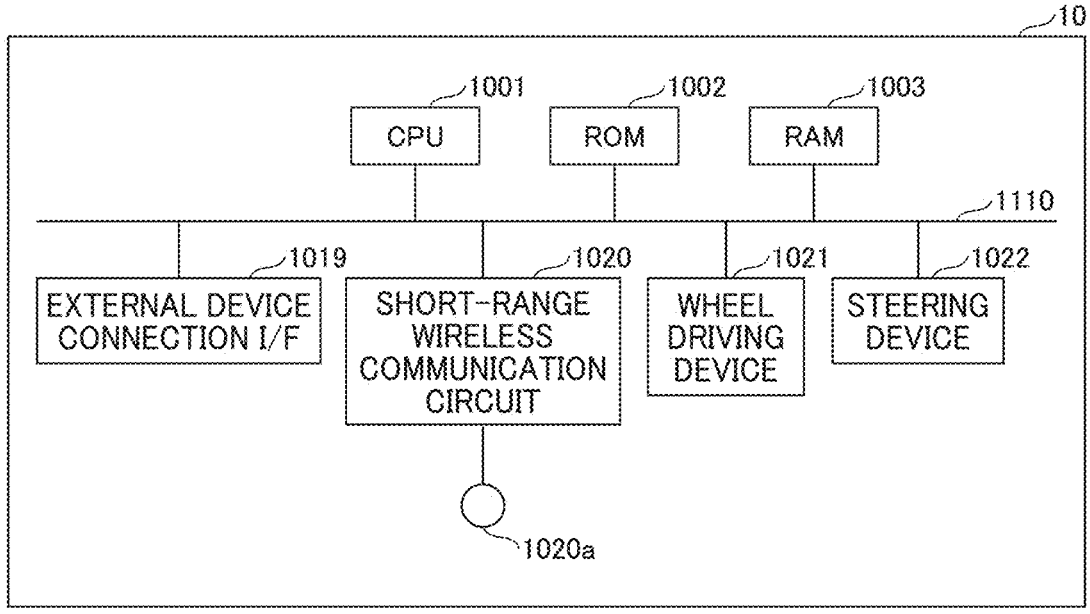
FIG. 13 is a block diagram illustrating a hardware configuration of a vehicle device, according to the exemplary embodiment of the disclosure.

FIG. 13 is a block diagram illustrating a hardware configuration of a vehicle device according to the present embodiment. The vehicle device 10 includes, for example, a CPU 1001, a ROM 1002, a RAM 1003, an external device connection I/F 1019, a short-range communication circuit 1020, an antenna 1020a for the short-range communication circuit 1020, a wheel driving device 1021, and a steering device 1022.

The CPU 1001 is an arithmetic device that executes a program stored in the ROM 1002 to implement functions of the vehicle device 10. The ROM 1002 is a nonvolatile memory storing data such as a program for the vehicle device 10. The ROM 1002 may be a rewritable flash memory, such as a flash ROM. The RAM 1003 is a volatile memory used as a work area for the CPU 1001.

The external device connection I/F 1019 is a wired communication interface for performing wired connection and communication with, for example, the robot terminal 7.

The short-range communication circuit 1020 is, for example, a wireless communication interface for performing wireless communication by the same wireless communication method as that of the robot terminal 7, for example.

The wheel driving device 1021 is an example of a driving device that drives wheels for causing the vehicle device 10 to move. The wheel driving device 1021 includes, for example, a motor.

The steering device 1022 is an example of a steering device that steers the vehicle device 10 caused to move by the wheel driving device 1021. For example, the steering device 1022 may change the direction or inclination of the wheel, or may change the direction of the vehicle device 10 (robot R) by controlling the number of rotations or speed of the left wheel and the right wheel.

Functional Configuration of Communication System

Figure 14:
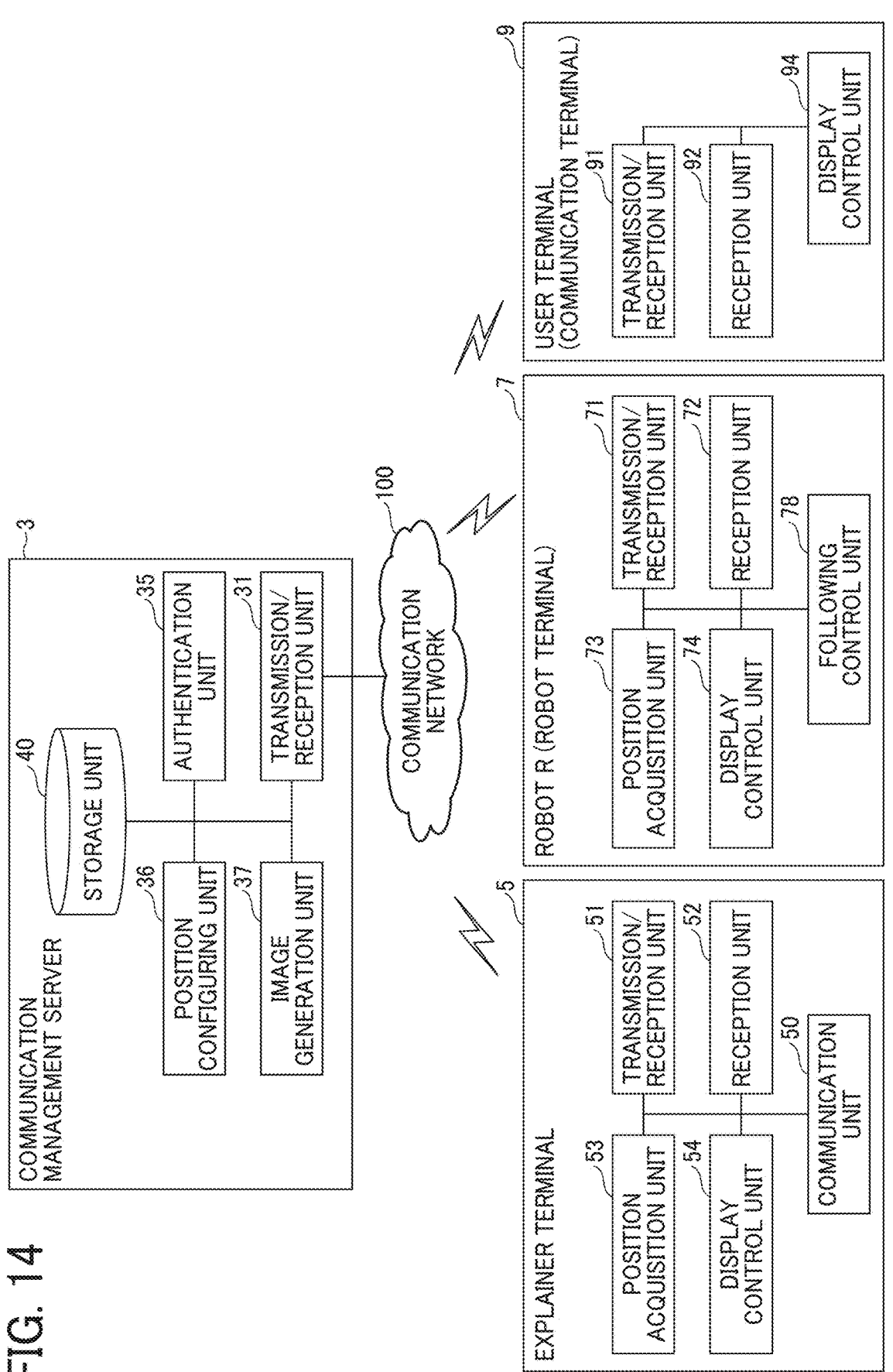
FIG. 14 is a block diagram illustrating a functional configuration of a communication system, according to the exemplary embodiment of the disclosure.

A functional configuration of the communication system 1 is described with reference to FIG. 14. FIG. 14 is a block diagram illustrating a functional configuration of the communication system 1 according to the present embodiment.

Communication Management Server

As illustrated in FIG. 14, the communication management server 3 includes a transmission/reception unit 31, an authentication unit 35, a position configuring unit 36, and an image generation unit 37. These units are functions or devices implemented by operating one or more of the components illustrated in FIG. 3 in response to an instruction from the CPU 301 operating according to the a program loaded from the SSD 304 to the RAM 303. The communication management server 3 further includes a storage unit 40 implemented by the ROM 302, the RAM 303, or the SSD 304 illustrated in FIG. 3. The storage unit 40 stores position correspondence information (matching information) indicating a correspondence relationship between a position in the real space and a position in the virtual space.

Position Information Management Table

The storage unit 40 stores a position information management table as illustrated in FIG. 15. In the position information management table, information indicating a name of a person or a robot (a name in the case of a person), a login identifier (ID), a password, an icon ID, an icon image, real space position information, virtual space position information, a belonging destination, and a dedicated voice communication counterpart is stored in association with one another. The first half information, which includes information on the name, the login ID, the password, the icon ID, and the icon image, is information that is rarely changed. The latter information, which includes information on the real space position information, the virtual space position information, the belonging destination, and the dedicated voice communication counterpart, is highly likely to be changed by the situation in the exhibition in the real space and the operation of the user Y. The icon image is merely schematically illustrated, and in actuality, data of the icon or a uniform resource locator (URL) in the storage unit 40 in which the icon is stored to be managed, for example. In addition, the icon is related not only to a predetermined person but also to a communication terminal (for example, the explainer terminal 5 or the user terminal 9) used by the same predetermined person.

Figure 18:
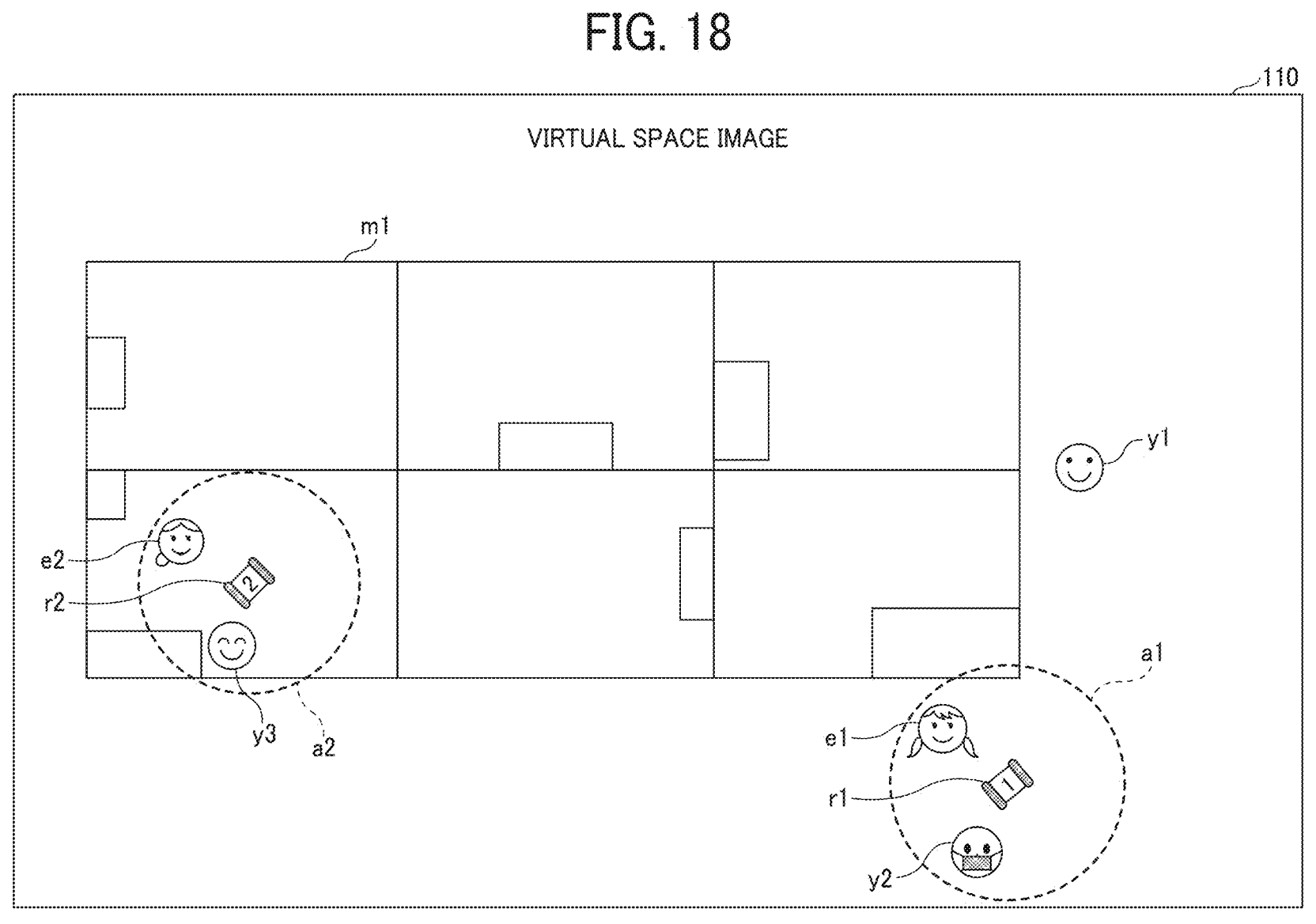

The "belonging destination" is information for specifying, for example, the robot R1 (icon ID) associated with an icon e1 of the explainer E1 and an icon y2 of the user Y2 in FIG. 18. The "dedicated voice communication counterpart" indicates information for specifying a counterpart (in the description of the present embodiment, an icon ID) in the case where the explainer E performs voice communication in which audio, or the voice, is disabled to the users other than one who is a counterpart.

Functional Units

The transmission/reception unit 31 performs data communication with another terminal (device).

The authentication unit 35 performs login authentication for another terminal (device).

The position configuring unit 36 performs processing such as storing and configuring virtual space terminal (device) position information indicating a position in the virtual space corresponding to real space terminal position information in the "virtual space position information" in FIG. 15 based on the position correspondence information (matching information) indicating a correspondence relationship between a position in the real space and a position in the virtual space.

The image generation unit 37 generates a virtual space image as illustrated in FIG. 18, which is described later.

The communication management server 3 may include a plurality of servers. In this case, the fields of the position information management table are divided and stored according to the role of each server.

Explainer Terminal

As illustrated in FIG. 14, the explainer terminal 5 includes a communication unit 50, a transmission/reception unit 51, a reception unit 52, a position acquisition unit 53, and a display control unit 54. These units are functions or devices implemented by operating one or more of the components illustrated in FIG. 3 in response to an instruction from the CPU 501 operating according to the a program loaded from the EEPROM 504 to the RAM 503.

The communication unit 50 performs communication with the microphone-equipped earphone 6 by processing of the short-range communication circuit 520.

The transmission/reception unit 51 performs data communication with another terminal (device) via the communication network 100.

The reception unit 52 receives an operation performed by a person (for example, the explainer E).

The position acquisition unit 53 acquires position information indicating an outdoor or indoor position by processing of the GPS receiver 511.

The display control unit 54 displays various images on the display 518 of the explainer terminal 5.

In the present embodiment, the position information indicating the outdoor or indoor position of the explainer terminal 5 is acquired using the GPS, but the present disclosure is not limited to this. For example, the display control unit 54 can acquire the position information of the explainer terminal 5 by causing the display 518 of the explainer terminal 5 to display code information (a two-dimensional code such as a QR CODE (registered trademark) or a one-dimensional code such as a barcode) in which the position information of the explainer terminal 5 is embedded, and reading the code information with a camera of a smartphone owned by the explainer E.

Robot Terminal

As illustrated in FIG. 14, the robot R (robot terminal 7) includes a transmission/reception unit 71, a reception unit 72, a position acquisition unit 73, a display control unit 74, and a following control unit 78. These units are functions or devices implemented by operating one or more of the components illustrated in FIG. 3 in response to an instruction from the CPU 501 operating according to a program loaded from the EEPROM 504 to the RAM 503.

The transmission/reception unit 71 performs data communication with another terminal (device) via the communication network 100.

The reception unit 72 receives an operation performed by a person (for example, the explainer).

The position acquisition unit 73 acquires position information indicating an outdoor or indoor position by processing of the GPS receiver 511.

The display control unit 74 displays various images on the display 518 of the robot terminal 7.

In the present embodiment, the position information indicating the outdoor or indoor position of the robot terminal 7 is acquired using the GPS, but the present disclosure is not limited to this. For example, the display control unit 74 can acquire the position information of the robot R (robot terminal 7) by causing the display 518 of the robot R (robot terminal 7) to display code information (a two-dimensional code such as a QR CODE (registered trademark) or a one-dimensional code such as a barcode) in which the position information of the robot R (robot terminal 7) is embedded, and reading the code information with a camera of a smartphone owned by the explainer E.

The following control unit 78 performs image recognition of an image of a person captured by the wide-angle imaging device 8 or the CMOS 513, and performs control to follow the person.

User Terminal

As illustrated in FIG. 14, the user terminal 9 includes a transmission/reception unit 91, a reception unit 92, and a display control unit 94. These units are functions or devices implemented by operating one or more of the components illustrated in FIG. 3 in response to an instruction from the CPU 501 operating according to a program loaded from the EEPROM 504 to the RAM 503.

The transmission/reception unit 71 performs data communication with another terminal (device) via the communication network 100.

The reception unit 72 receives an operation performed by a person (for example, the user Y).

The display control unit 74 displays various images on the display 518 of the user terminal 9.

Process or Operation of Communication System

A process or operation of the communication system is described with reference to FIGS. 16 to 28.

Login Process

Figure 16:
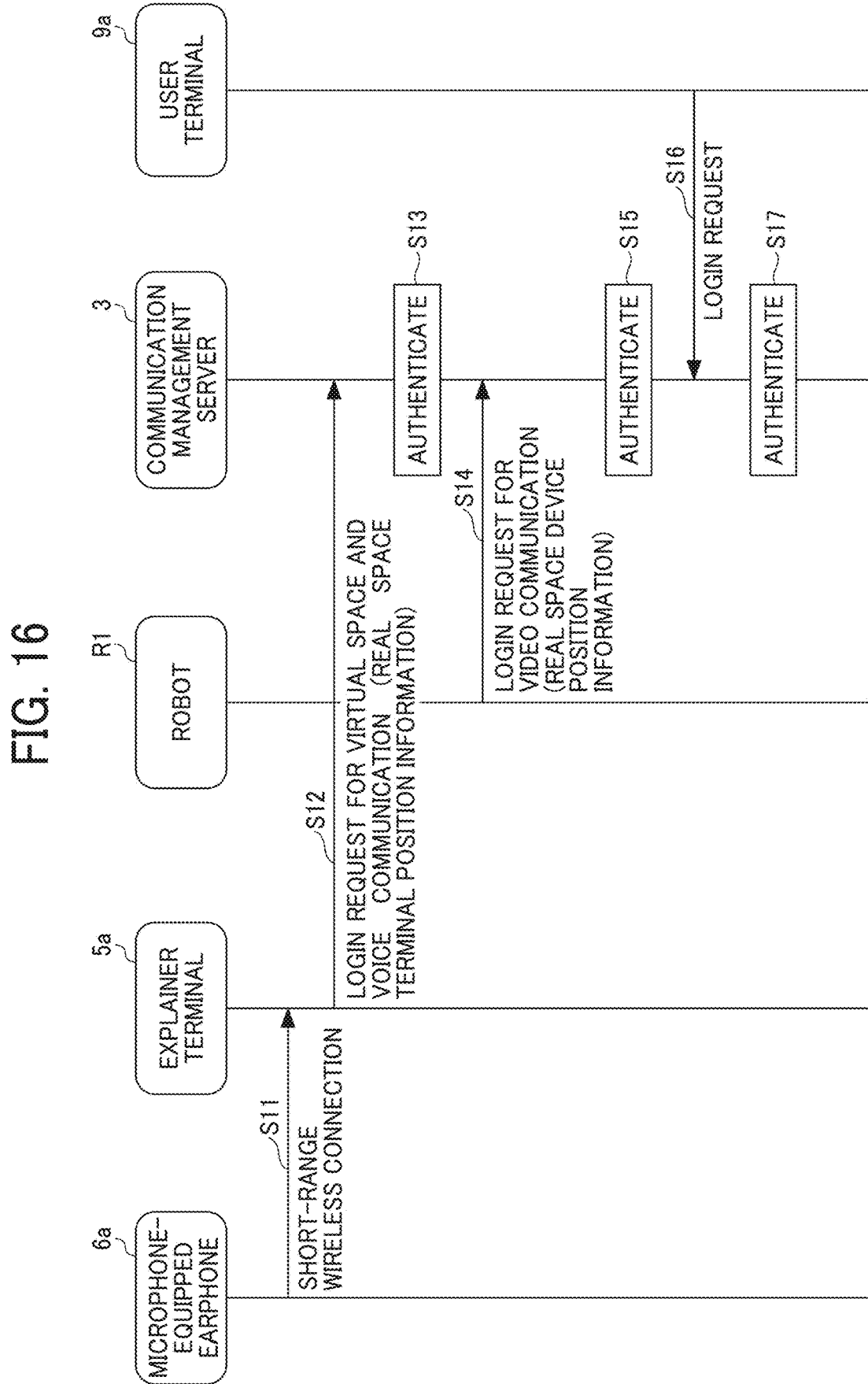
FIG. 16 is a sequence diagram illustrating a login process in which terminals and a robot log in, according to the exemplary embodiment of the disclosure.

First, a login process of the terminals and the robot is described with reference to FIG. 16. FIG. 16 is a sequence diagram illustrating a login process in which the terminals and the robot log in. In the case of the robot R, the robot terminal 7 actually logs in. In the following description of the present embodiment, the processing of each of the microphone-equipped earphone 6a, the explainer terminal 5a, the robot R1 (the robot terminal 7a), the communication management server 3, and the user terminal 9a is described. The microphone-equipped earphone 6a, the explainer terminal 5a, the robot R1 (robot terminal 7a), and the user terminal 9a are examples of the microphone-equipped earphone 6, the explainer terminal 5, the robot R (robot terminal 7), and the user terminal 9, respectively.

S11: Before login is performed, pairing is performed between the microphone-equipped earphone 6a and the explainer terminal 5a, so that the microphone-equipped earphone 6a and the explainer terminal 5a establish a short-range wireless connection.

S12: The reception unit 52 of the explainer terminal 5a receives a login operation (for example, input of a login ID and a password) performed by the explainer E1, and the transmission/reception unit 51 transmits a login request for a virtual space and voice communication to the communication management server 3. The login request includes the login ID and the password of the explainer E1. The login request further includes real space terminal position information indicating the position of the explainer terminal 5a in the real space. The real space terminal position information for the explainer terminal 5a is information indicating a position of the explainer terminal 5a in the real space (an exhibition hall in the description of the present embodiment). The real space terminal position information is acquired by the position acquisition unit 53 of the explainer terminal 5a. As a result, the transmission/reception unit 31 of the communication management server 3 receives the login request from the explainer terminal 5a. Each time the explainer terminal 5a moves, the real space terminal position information after the movement is transmitted from the explainer terminal 5a to the communication management server 3.

S13: In the communication management server 3, the authentication unit 35 performs login authentication based on whether the combination of the login ID and the password received by the transmission/reception unit 31 in the processing of S12 matches a combination of a login ID and a password stored in the position information management table. When the login authentication is successful, the authentication unit 35 stores the real space terminal position information received in the processing of S12 in the "real space position information" field of a record including the login ID and the password used for the authentication. The timing of transmission and reception of the real space terminal position information is not limited to the processing of S12, but may be any timing as long as it is before the processing of S31, which is described later, starts. The authentication result is transmitted to the explainer terminal 5a as the response.

S14: The reception unit 72 of the robot R1 receives a login operation (for example, input of a login ID and a password) performed by the explainer E1, and the transmission/reception unit 71 transmits a login request for the video communication to the communication management server 3. The login request includes the login ID and the password of the robot R1. The login request further includes real space device position information indicating a position of the robot R1 in the real space (the exhibition hall in the description of the embodiment). The real space device position information of the robot R1 is information indicating the position of the robot R1 in the real space, acquired by the position acquisition unit 73 of the robot R1. Accordingly, the transmission/reception unit 31 of the communication management server 3 receives the login request from the robot R1.

S15: In the communication management server 3, the authentication unit 35 performs login authentication based on whether the combination of the login ID and the password received by the transmission/reception unit 31 in the processing of S14 matches a combination of a login ID and a password stored in the position information management table. When the login authentication is successful, the authentication unit 35 stores the real space device position information received in the processing of S14 in the "real space position information" field of a record including the login ID and the password used for the authentication. The timing of transmission and reception of the real space device position information is not limited to the processing of S14, but may be any timing as long as it is before the processing of S31, which is described later, starts. The authentication result is transmitted to the robot R1 (the robot terminal 7a) as the response.

S16: The reception unit 92 of the user terminal 9a receives a login operation (for example, input of a login ID and a password) performed by the user Y, and the transmission/reception unit 91 transmits a login request for a service of the communication management server 3 to the communication management server 3. The login request includes the login ID and the password of the user terminal 9. As a result, the transmission/reception unit 31 of the communication management server 3 receives the login request from the user terminal 9a.

S17: In the communication management server 3, the authentication unit 35 performs login authentication based on whether the combination of the login ID and the password received by the transmission/reception unit 31 in the processing of S16 matches a combination of a login ID and a password stored in the position information management table. The authentication result is transmitted to the user terminal 9a as the response.

Figure 17:
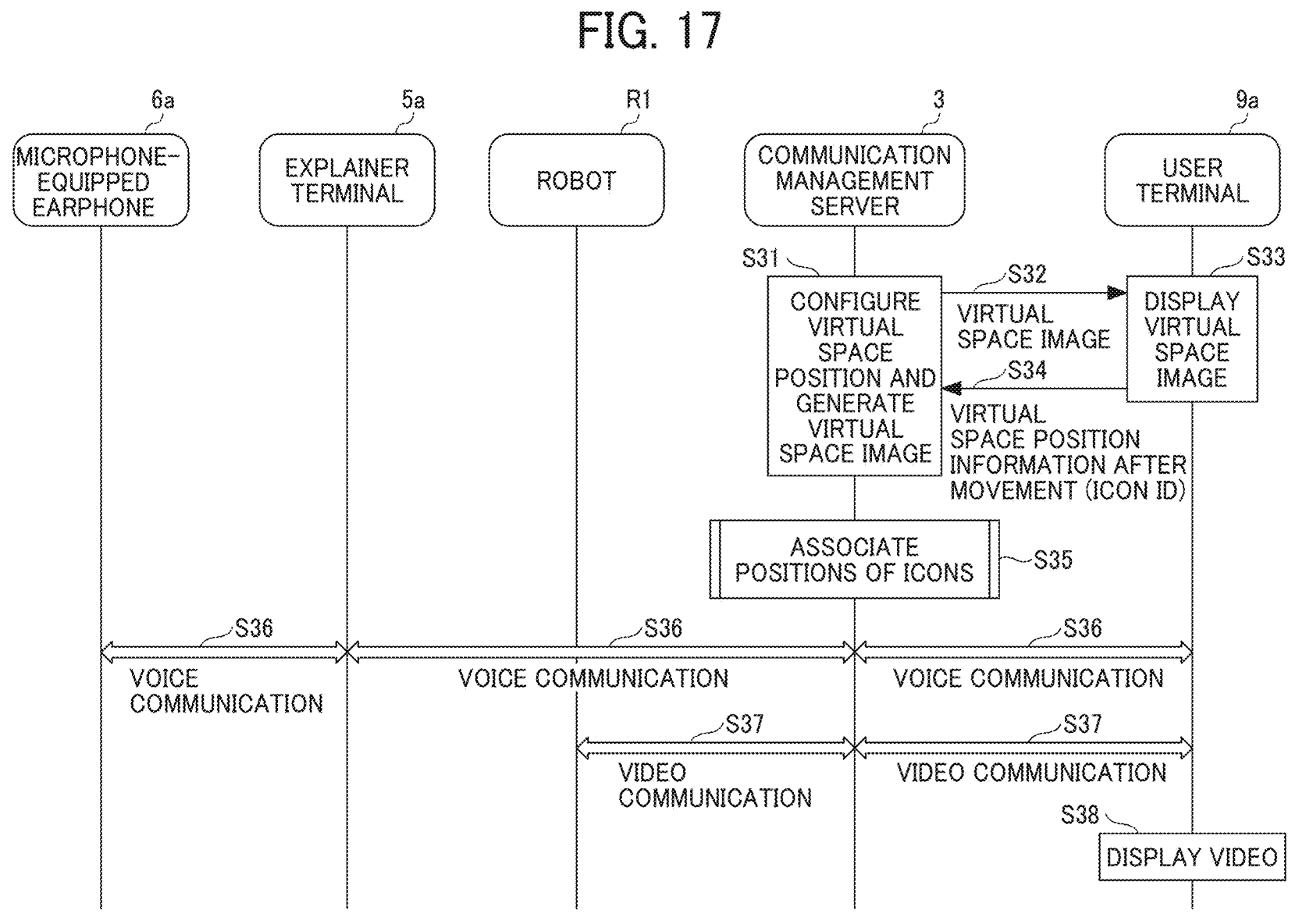

In the following description of the present embodiment, it is assumed that all the login authentication is successful. Displaying Virtual Space Image, Establishing Voice Communication, Establishing Video Communication A process of displaying a virtual space image, performing voice communication, and establishing video communication is described with reference to FIGS. 17 to 21. FIG. 17 is a sequence diagram illustrating a process of displaying a virtual space image, establishing voice communication, and establishing video communication.

S31: In the communication management server 3, the position configuring unit 36 stores and configures, in the "virtual space position information" field of the record including the login ID and the password used for the authentication of the processing of S13, virtual space (terminal) position information indicating a position in the virtual space and corresponding to the real space terminal position information received in the processing of S12, based on the position correspondence information (matching information) indicating the correspondence between the position in the real space and the position in the virtual space. Similarly, the position configuring unit 36 stores and configures, in the "virtual space position information" field of the record including the login ID and the password used for the authentication of the processing of S15, virtual space (device) position information corresponding to the real space device position information received in the processing of S14, based on the position correspondence information. Further, the position configuring unit 36 stores and configures, in the "virtual space position information" field of the record including the login ID and the password used for the authentication of the processing of S17, virtual space (device) position information indicating an initial position.

Further, as illustrated in FIG. 18, the image generation unit 37 generates the virtual space image by mapping, with respect to a layout map ml schematically illustrating the exhibition hall in the real space, an icon image corresponding to the virtual space position information, based on virtual space position information managed by the position information management table.

S32: The transmission/reception unit 31 transmits the virtual space image generated by the image generation unit 37 to the user terminal 9a. As a result, the transmission/reception unit 91 of the user terminal 9a receives the virtual space image.

S33: In the user terminal 9a, the display control unit 94 displays on the display 518 a screen 110 on which the virtual space image as illustrated in FIG. 18 is displayed.

FIG. 18 is a diagram illustrating the virtual space image on which an initial position of the icon Y1 of the user Y1 is indicated.

As illustrated in FIG. 18, the virtual space image includes the layout map ml schematically illustrating the exhibition hall in the real space, and the icons corresponding to the persons and the robots attending the exhibition in the virtual space. In the description of the present embodiment, the icon y1 of the user Y1 who is attending the exhibition in the virtual space appears, or is displayed, at the initial position (for example, on the right in the virtual space image).

In addition, the icon e1 indicating the explainer E1 and the icon y2 indicating the user Y2 who is remotely attending the exhibition in the virtual space appear, or is displayed, in an association area a1 centered around the icon r1 indicating the robot R1. This indicates that the Explainer E1 indicated by the icon e1 and the user Y2 indicated by the icon y2 belong to the robot R1 indicated by the icon r1. Since the belonging relationship is managed in the "belonging destination" field of the position information management table, the image generation unit 37 of the communication management server 3 generates the virtual space image with reference to the "belonging destination" field of the position information management table, in Step S32 described above.

In FIG. 18, the association area a1 is indicated by a broken line circle. In some embodiments, the association area a1 is not actually indicated, for example by the broken line circle. In some embodiments, in alternative to a circle, the association area a1 is indicated by a polygonal.

Further, the explainer terminal 5a of the explainer E1 indicated by the icon e1 in the association area a1 and the user terminal 9b of the user Y2 indicated by the icon y2 can perform voice communication by establishing a voice communication session. Accordingly, the explainer E1 can explain the state of the exhibition in the real space (real world) to the user Y2 by using the microphone-equipped earphone 6, and the user Y2 can ask questions about the exhibition in the real space to the explainer E1 by using the user terminal 9b.

Further, the explainer terminal 5a of the explainer E1 indicated by the icon e1 in the association area a1 and the user terminal 9b of the user Y2 indicated by the icon y2 can receive and display the video transmitted by the robot R1 indicated by the icon r1, by establishing a video communication session.

Although the robot R1 can distribute audio data using the video communication session, the robot R1 does not transmit the audio data because the robot R1 picks up noise or conversation around the robot R1. By contrast, when the above-described voice communication session is used, since the explainer E1 does not speak to the robot R1 but uses the microphone-equipped earphone 6, the users Y1 and Y2 can clearly hear the voice of the explainer E1 while hearing little noise or conversation around the robot R1.

On the left of the screen 110 on which the virtual space image is displayed, the icons r2, e2, and y3 included in an association area a2 indicate the robot R2, the explainer E2, and the user Y3, respectively, and have substantially the same relationship as the relationship between the icon r1, the icon e1, and the icon y2 included in the above-described association area a1, and the redundant description is omitted.

Figure 19:
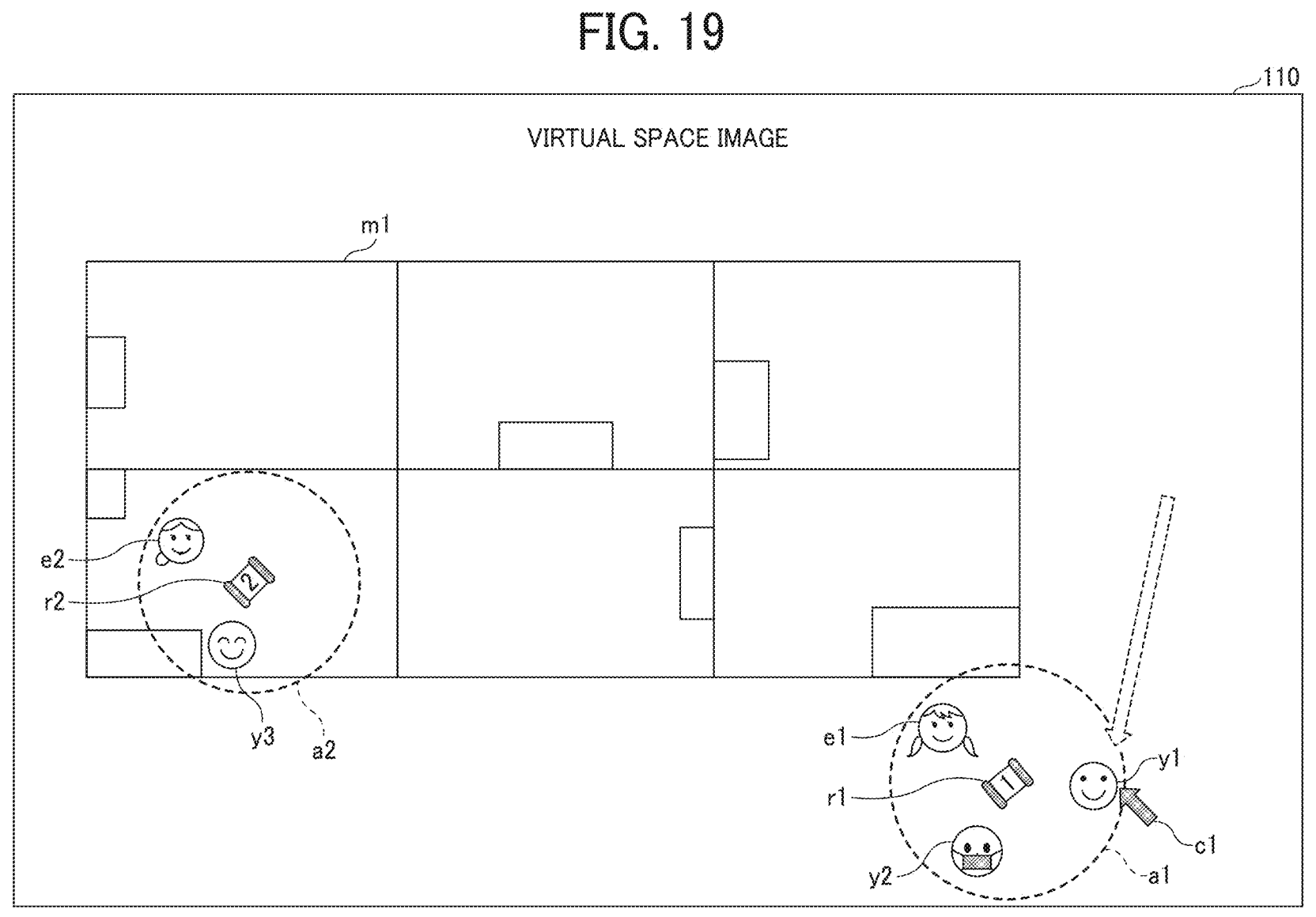

S34: In the user terminal 9a, the reception unit 92 receives, from the user Y1, an operation of moving the icon y1 into the association area a1 using a cursor c1 as illustrated in FIG. 19. Then, the transmission/reception unit 91 transmits the virtual space position information after the movement of the icon y1 to the communication management server 3. The virtual space position information includes an icon ID "y21" of the user Y1. Accordingly, the transmission/reception unit 31 of the communication management server 3 receives the virtual space position information after the movement.

The position configuring unit 36 overwrites, in the position information management table, the "virtual space position information" field corresponding to the icon ID received in the processing of S34 with virtual space position information generated after the movement and reflecting the movement. Accordingly, the image generation unit 37 generates the latest virtual space image using the virtual space position information that is overwritten after the movement. By repeating the processing of S31 to S34, the virtual space image displayed on the user terminal 9a is updated.

The user Y1 may move the icon y1 so as to overlap with the icon r1 in FIG. 18. In this case, the position configuring unit 36 changes the position of the icon y1 to a position that does not overlap with the other icons e1, r1, and y2, and stores the changed position in the "virtual space position information" field of the position information management table. Accordingly, as illustrated in FIG. 19, the image generation unit 37 generates the virtual space image on which the icon y1 does not overlap with the other icons.

Figure 20:
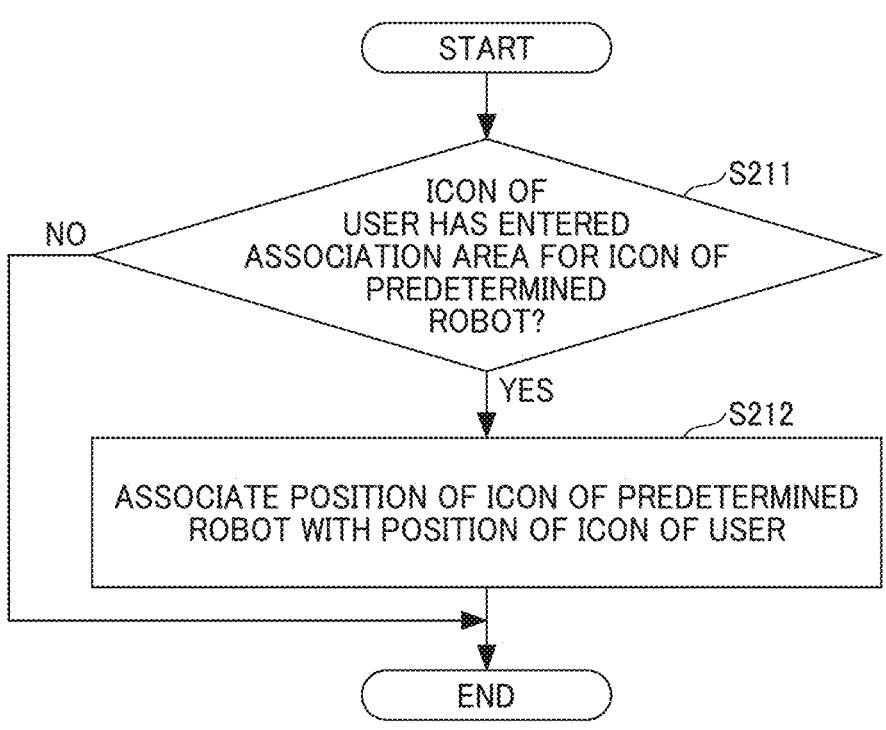
FIG. 20 is a flowchart of a process for associating positions of icons according to the exemplary embodiment of the disclosure.

S35: The communication management server 3 performs processing of associating positions of icons. A process for associating the positions of the icons is described with reference to FIG. 20. FIG. 20 is a flowchart of a process for associating positions of icons according to the present embodiment.

S211: First, the position configuring unit 36 refers to the "virtual space position information" field in the position information management table and determines whether the icon y1 has entered the association area a1 of the icon r1 of the robot R1, which is a predetermined robot.

S212: When the position configuring unit 36 determines that the icon y1 has entered the association area a1 (S211; YES), the position configuring unit 36 associates the position of the icon r1 of the predetermined robot R1 in the virtual space with the position of the icon y1 of the user Y1 in the virtual space. More specifically, the position configuring unit 36 stores and manages the icon ID "r21" of the robot R1 in the "belonging destination" field of the record of the user Y1 in the position information management table. When the position configuring unit 36 does not determine that the icon y1 has entered the association area a1 (S211; NO), the processing of S212 is not executed. The case where the processing of S212 is executed is described below.

S36: The transmission/reception unit 31 of the communication management server 3 refers to the position information management table. Further, a voice communication session is established between three terminals, [1] the user terminal 9a for which a login ID "L21" is used [2-1] the explainer terminal 5a for which a login ID "L11" is used, and [2-2] the user terminal 9b for which a login ID "L22" is used, based on (1) the login ID "L21" of the user Y1 indicated by the icon y1 that has entered the association area a1 and (2) the login IDs "L11" and L12" that are in a record including, in the "belonging destination" field, the same icon ID as the icon ID "r2l" that is included in the "belonging destination" field of another record that includes the login ID "L21." In addition, since the short-range wireless connection is established between the microphone-equipped earphone 6 and the explainer terminal 5a by the above-described processing of S11, voice communication can be performed between the microphone-equipped earphone 6, the explainer terminal 5a, and the user terminal 9a.

S37: The transmission/reception unit 31 of the communication management server 3 refers to the position information management table. Further, a video communication session is established between the user terminal 9a for which the login ID "L21" is used and the robot R1 for which a login ID "L32" is used, based on the login ID "L21" of the user Y1 indicated by the icon y1 that has entered the association area a1 and the login ID "L31" that is in a record including, in the "belonging destination" field, the same icon ID as the icon ID "r21" that is included in the "belonging destination" field of another record that includes the login ID "L21." Thus, the robots R1 and the user terminals 9a can perform video communication with each other via the communication management server 3. For example, the robot R1 captures a video of the exhibition and transmits the video data to the user terminal 9a, and the display 518 of the user terminal 9a displays the video of the exhibition, accordingly. By contrast, when the user terminal 9a captures a video including the face of the user Y1 and transmits the video data to the robot R1, the video including the face of the user Y1 is displayed on the display 518 of the robot terminal 7a of the robot R1.

When the robot R1 performs video communication with a plurality of user terminals, the robot R1 transmits the video of the exhibition to the plurality of user terminals via the communication management server 3, so that the video of the exhibition is displayed on each of the plurality of user terminals. By contrast, each communication terminal transmits a video including an image of the face of the corresponding user to the robot R1 via the communication management server 3, so that the image of the face of each user is displayed on the robot R1. Thus, the explainer E1 can explain, for example, a product while checking the facial expression of each user.

Figure 21:
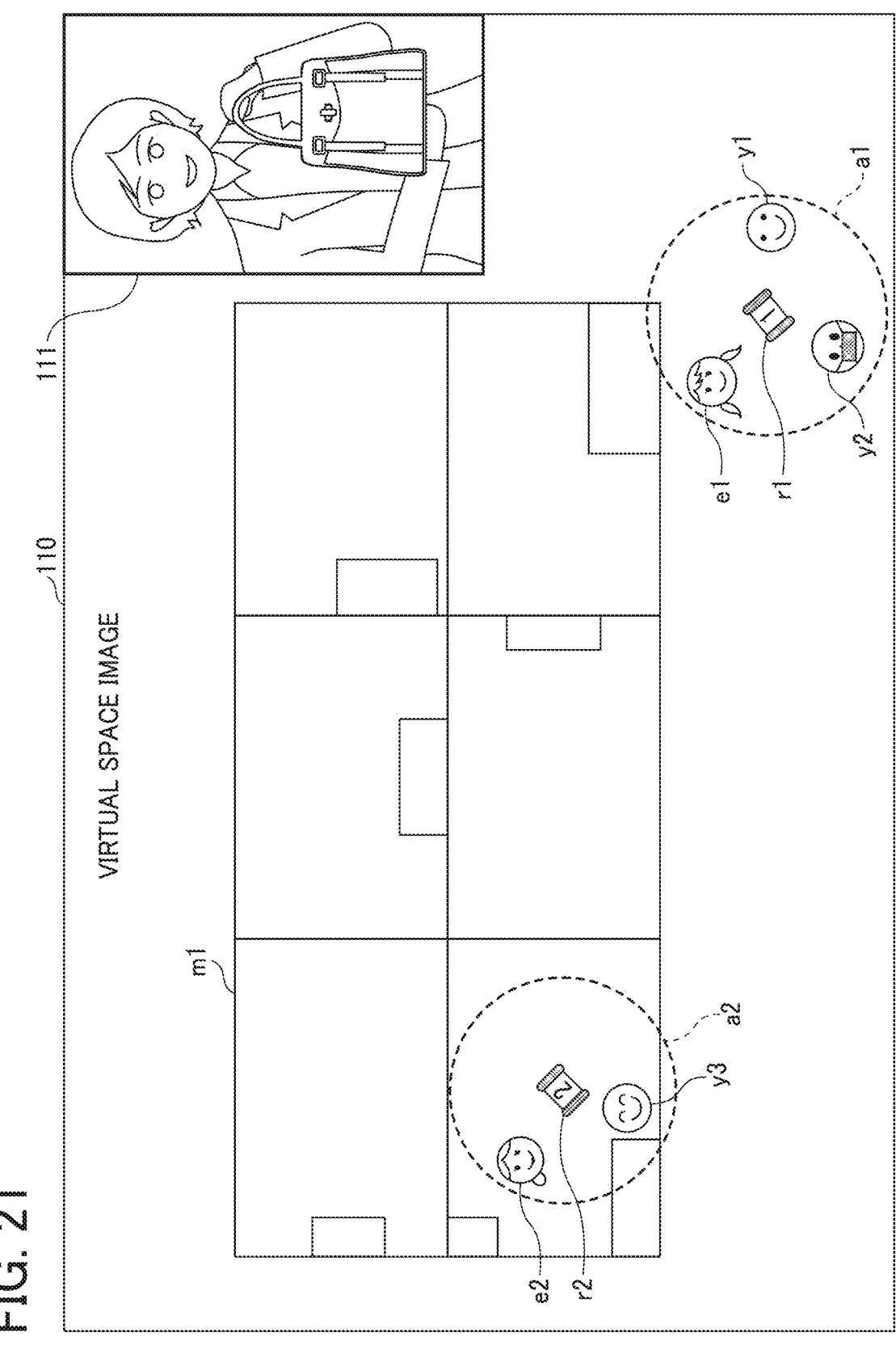
FIG. 21 is a diagram illustrating a virtual space image after the icon of the user is moved in order to associate the icon with the icon of the robot, according to the exemplary embodiment of the disclosure.

S38: In the user terminal 9a, the transmission/reception unit 91 receives the video transmitted by the processing of 537, and as illustrated in FIG. 21, the display control unit 94 displays the video of the exhibition in the real space on a separate screen (such as a pop-up screen) 111. In the example, a scene in which the explainer E1 is giving explanation for a bag is displayed. As described above, the user Y1 can view the video of a desired part of the exhibition in the real space without going to the exhibition in the real space.

Following Robot

Figure 22:
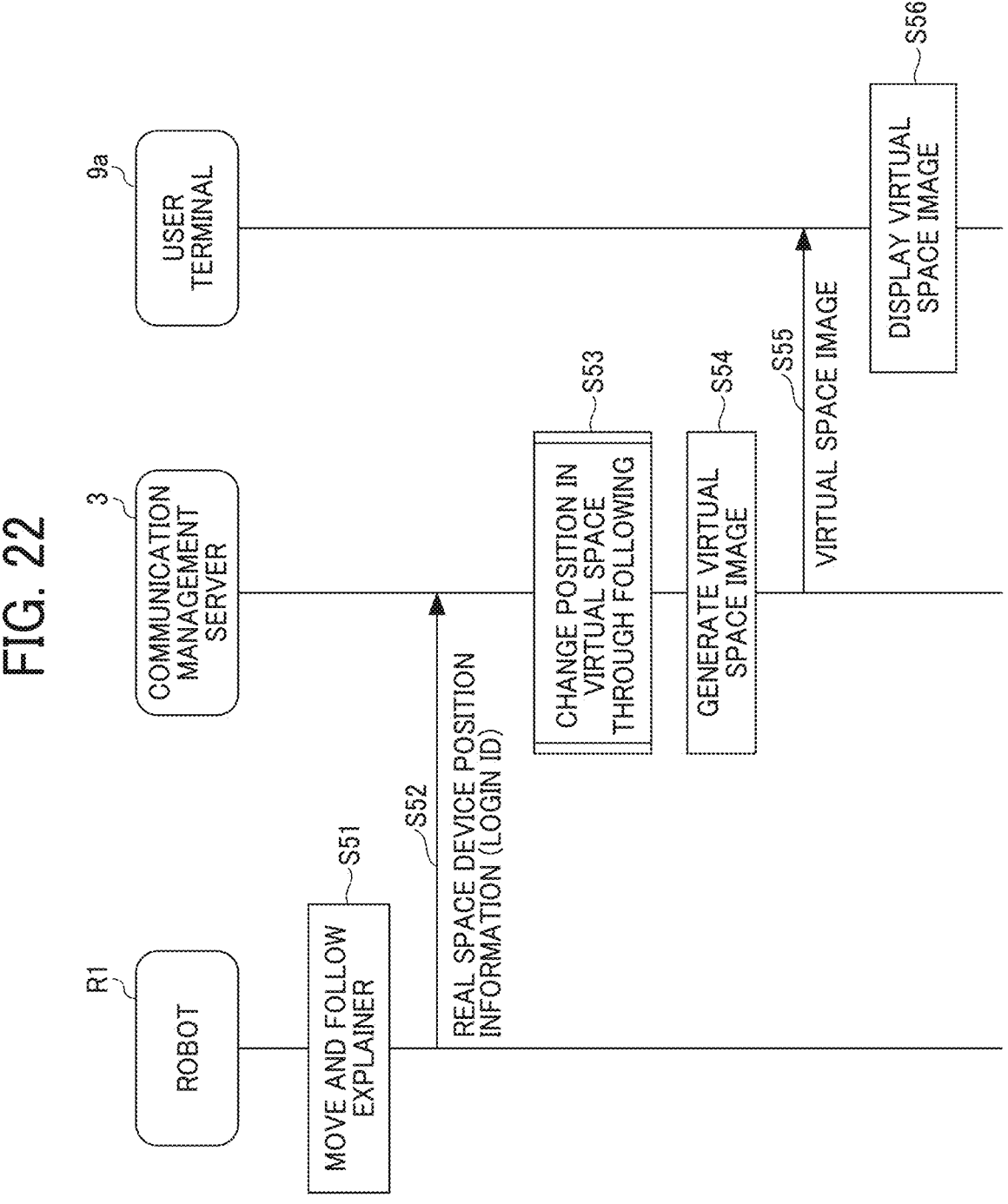
FIG. 22 is a sequence diagram illustrating a process in relation to which the icon of the user follows the icon of the robot according to a movement of the icon of the robot, according to the exemplary embodiment of the disclosure.
Figure 23:
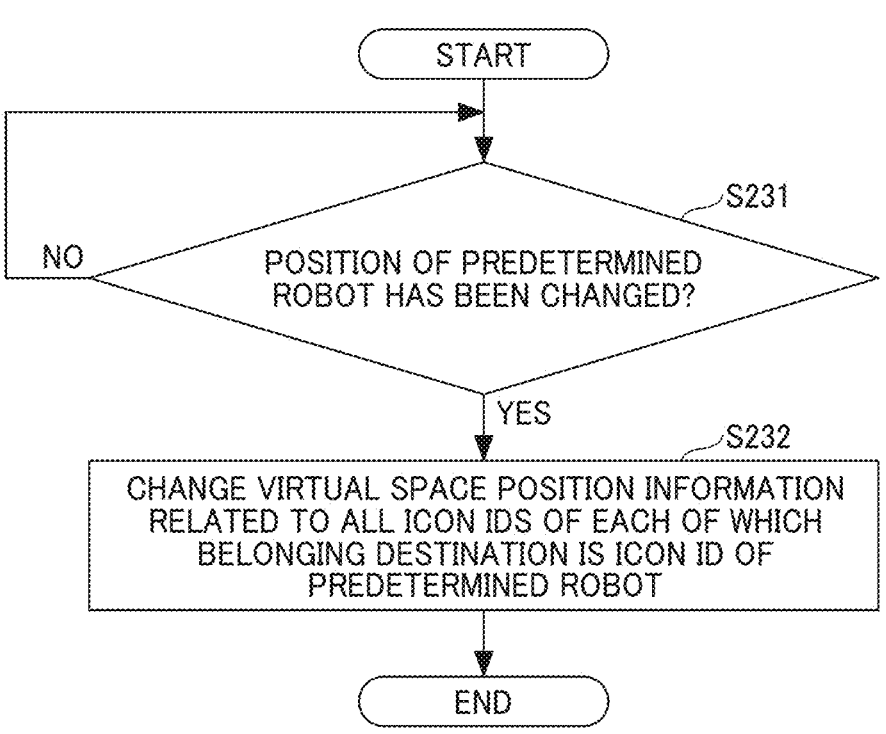
FIG. 23 is a flowchart of a process for changing a position in a virtual space through following, according to the exemplary embodiment of the disclosure.

A process where an icon of a user follows an icon of a robot according to a movement of the icon of the robot is described below with reference to FIGS. 22 to 24. FIG. 22 is a sequence diagram illustrating a process in relation to which an icon of a user follows an icon of a robot according to a movement of the icon of the robot.

S51: When the explainer E1 moves in the real space, the robot R1 follows the explainer E1 according to the movement of the explainer. In this case, in the robot R1, the following control unit 78 performs image recognition on the image of the explainer E1 captured by the CMOS 513 and performs control to follow the explainer E1.

S52: When the robot R1 moves to follow, the position acquisition unit 73 newly acquires the real space device position information, and the transmission/reception unit 71 transmits the real space device position information to the communication management server 3. The real space device position information includes a login ID "L31" for identifying the robot R1, which is a transmission source. As a result, the transmission/reception unit 31 of the communication management server 3 receives the real space device position information. In addition, the transmission/reception unit 31 overwrites, in the position information management table, with the real space device position information received in the processing of S52, in the "real space position information" field of the record including the login ID received in the processing of S52. Accordingly, the position configuring unit 36 also changes the corresponding virtual space position information based on the position correspondence information (matching information) indicating the correspondence relationship between the position in the real space and the position in the virtual space.

S53: The communication management server 3 performs a position change process in the virtual space through the following. A position change process in the virtual space through the following is described below with reference to FIG. 23.

The S231: The position configuring unit 36 refers to the "real space position information" field of the position information management table and determines whether the position of the predetermined robot R1 in the real space has been changed. When there is no change (S231: NO), the processing of S231 is repeated.

S232: When the position of the predetermined robot R1 in the real space is changed (S231: NO), the position configuring unit 36 refers to the position information management table and changes, in the association area a1, the virtual space terminal (device) position information related to all the icon IDs "e11," "y21," and "y22" of which the belonging destination is the icon ID "r21" of the predetermined robot R1.

S54: Referring back to FIG. 22, the image generation unit 37 newly generates the virtual space image based on the processing of S53.

S55: The transmission/reception unit 31 transmits the virtual space image generated in the processing of S54 to the user terminals 9a. As a result, the transmission/reception unit 91 of the user terminal 9a receives the virtual space image.

S56: In the user terminal 9a, as illustrated in FIG. 24, the display control unit 94 causes the display 518 to display the screen 110 including the virtual space image. In FIG. 24, with the movement of the explainer E1 in the real space, the icon e1 of the explainer E1 also moves in the virtual space.

Further, with the movement of the robot R1 following the explainer E1 in the real space, the icon r1 also moves by following the icon e1 in the virtual space. Further, with the movement of the icon r1 in the virtual space, the icons y1 and y2 in the association area a1 also move by following the icon r1 in the virtual space. Further, since the robot R1 captures an image of the explainer E1 who is moving while following the explainer E1 moving, a rear view of the explainer E1 is displayed on the separate screen 111.

Dedicated Voice Communication

Figure 25:
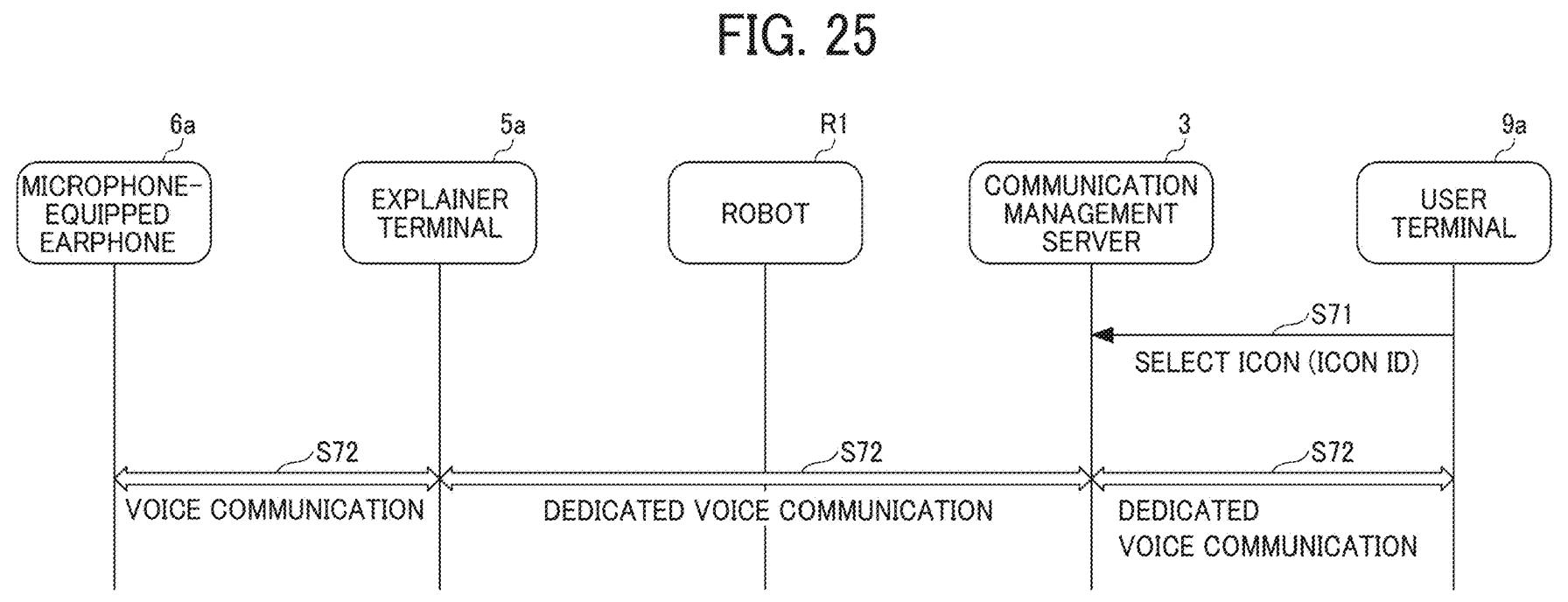
Figure 26:
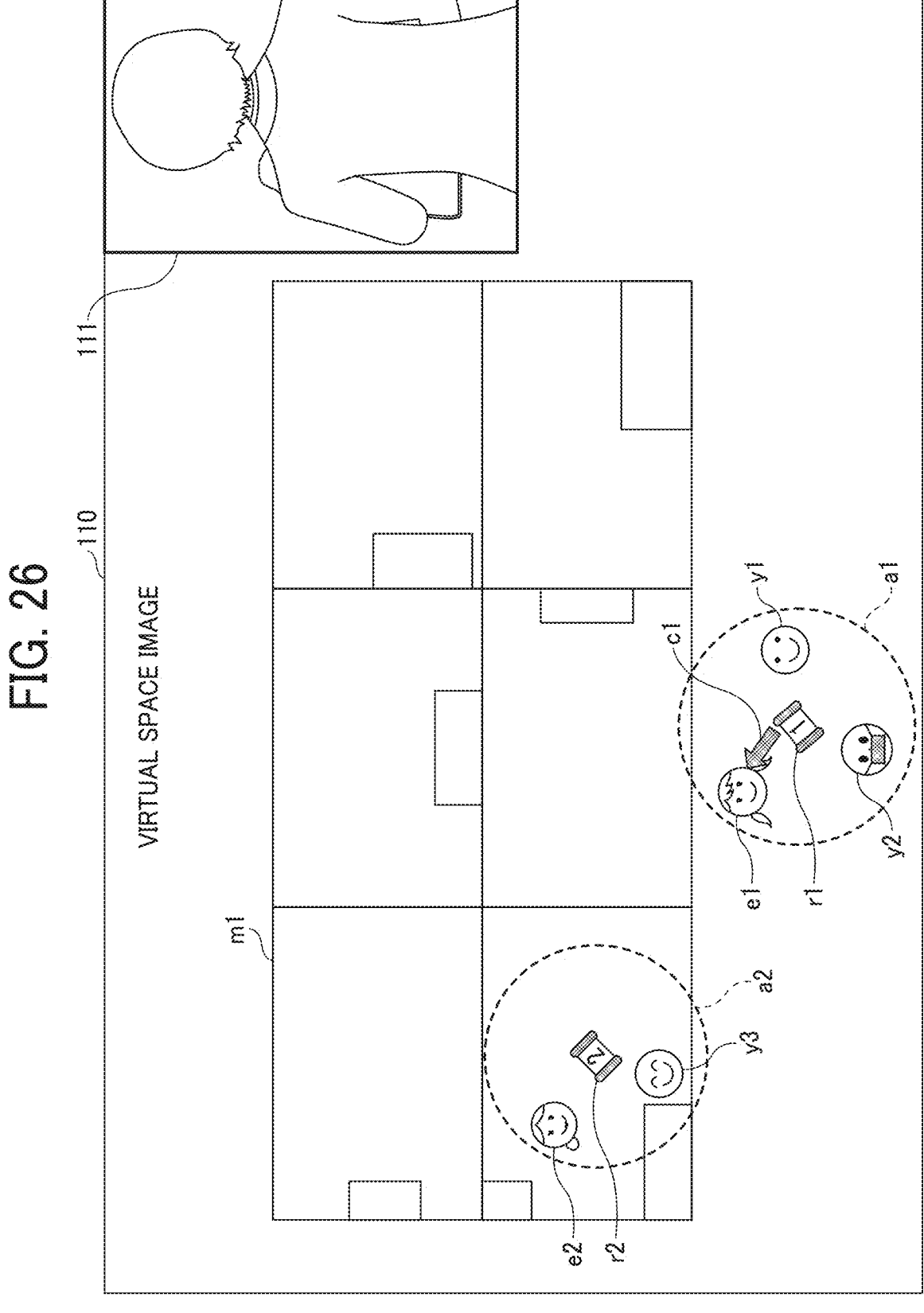
FIG. 26 is a diagram illustrating a virtual space image on which an icon of a counterpart for the dedicated voice communication to be performed is selected, according to the exemplary embodiment of the disclosure.

A process for establishing dedicated voice communication is described with reference to FIGS. 25 and 26. FIG. 25 is a sequence diagram illustrating a process for establishing dedicated voice communication according to the present embodiment. FIG. 26 is a diagram illustrating a virtual space image on which an icon of a counterpart for dedicated voice communication to be established is selected.

S71: In the user terminal 9a, the reception unit 92 receives a user operation, performed by the user Y1, of selecting an icon (in the example, the icon e1) other than his or her own icon y1 by using the cursor cl as illustrated in FIG. 26. Then, the transmission/reception unit 91 transmits information indicating the selection of the icon e1 to the communication management server 3 as a request to establish dedicated voice communication. This information includes the icon ID "y21" of the user Y1 who has selected the icon and the icon ID "e11" of the selected icon e1. Accordingly, the transmission/reception unit 31 of the communication management server 3 receives the information indicating the selection of the icon.

S72: The transmission/reception unit 31 of the communication management server 3 stores and manages the icon ID "y21" in the "dedicated voice communication counterpart" field of the record of the icon ID "e11" in the position information management table, and stores and manages the icon ID "e11" in the "dedicated voice communication counterpart" field of the record of the icon ID "y21" in the position information management table. As a result, the transmission/reception unit 91 establishes a dedicated voice communication session between the explainer terminal 5a for which the login ID "L11" associated with the icon ID "e11" is used and the user terminal 9a for which the login ID "L21" associated with the icon ID "y21" is used. Each of the icon "e1" and the icon "y21" is managed as a dedicated voice communication counterpart to the other one.

Since the short-range wireless connection is established between the microphone-equipped earphone 6a and the explainer terminal 5a by the processing of S11, dedicated voice communication can be performed between the microphone-equipped earphone 6a, the explainer terminal 5a, and the user terminal 9a. Accordingly, the user Y1 can talk to the explainer E1 in a manner that the voice content is not heard by the other user Y2, or the explainer E1 can respond to the user Y1 in a manner that the voice content is not heard by the other user Y2.

In FIG. 26, the user Y1 selects the icon e1 of the explainer E1, the present disclosure is not limited to this. For example, the user Y1 may select the icon y2 corresponding the other user Y2 in the same association area a1 to have a conversation with the user Y2 by dedicated voice communication. Further, the user Y1 may select the icon e2 of the explainer E2 in a different association area a2 to have a conversation with the explainer E2 by dedicated voice communication, or may select the icon y3 of the user Y3 to have a conversation with the user Y3 by dedicated voice communication. Further, not only the user Y but also the explainer E may start dedicated voice communication by selecting an icon other than his or her own icon with respect to the virtual space image displayed on the explainer terminal 5.

Changing Robot for Following

Figure 27:
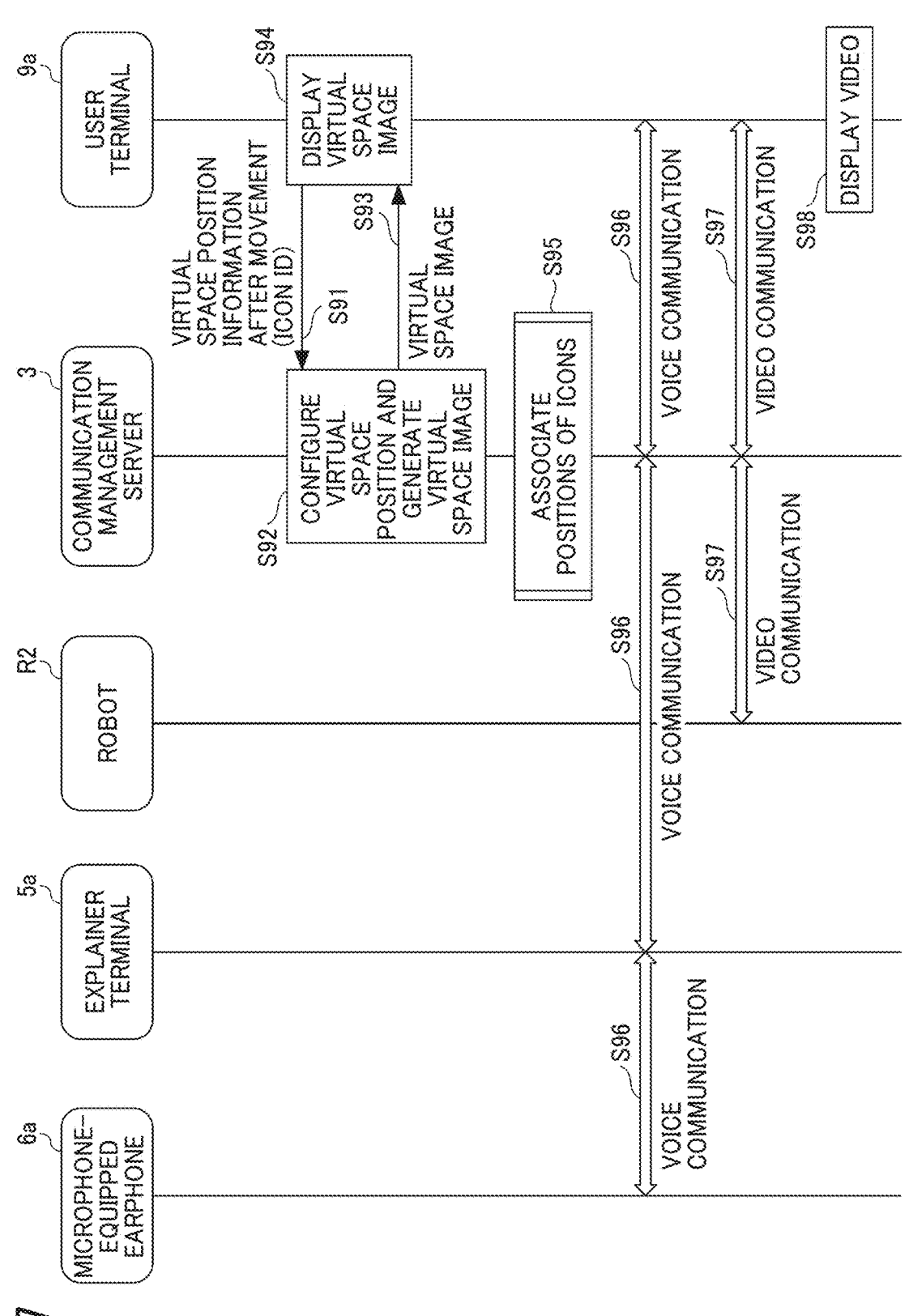
FIG. 27 is a sequence diagram illustrating a process of changing a robot for following according to the exemplary embodiment of the disclosure.
Figure 28:
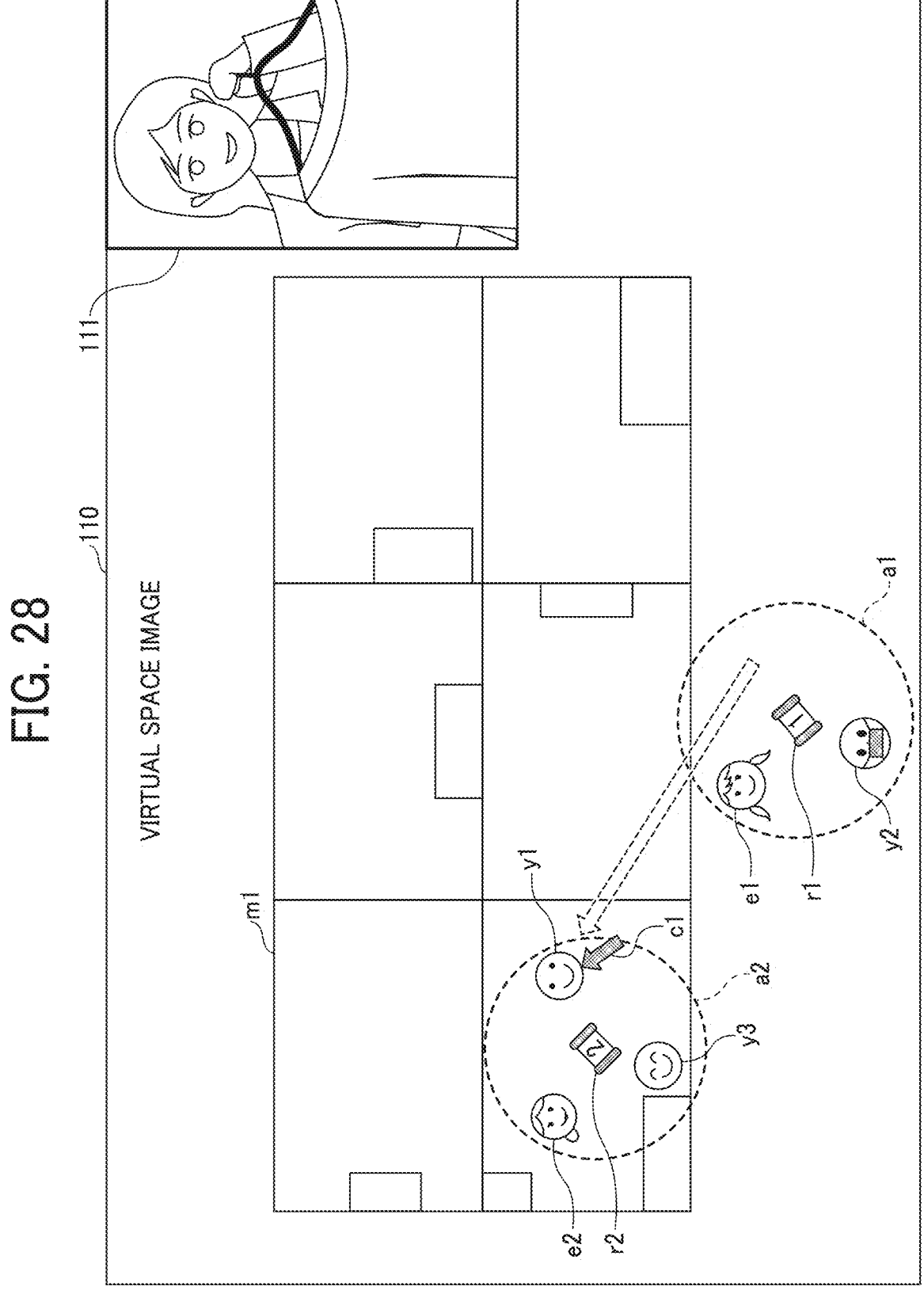
FIG. 28 is a diagram illustrating a virtual space image after the icon of the user is moved in order to associate the icon with an icon of another robot, according to the exemplary embodiment of the disclosure.

A process for changing a robot for the following is described below with reference to FIGS. 27 and 28. FIG. 27 is a sequence diagram illustrating a process of changing a robot for the following according to the present embodiment. FIG. 28 is a diagram illustrating a virtual space image after moving an icon of a user to associate the icon with an icon of another robot, according to the present embodiment. The processing from S91 to S94 is substantially the same as or similar to the processing of S34, S31, S32, and S33 described above.

S91: In the user terminal 9a, the reception unit 92 receives, from the user Y1, an operation of moving the icon y1 into the association area a2 using the cursor cl as illustrated in FIG. 28. Then, the transmission/reception unit 91 transmits the virtual space position information after the movement of the icon y1 to the communication management server 3. The virtual space position information includes an icon ID "y21" of the user Y1. Accordingly, the transmission/reception unit 31 of the communication management server 3 receives the virtual space position information after the movement.

S92: The position configuring unit 36 overwrites, in the position information management table, the "virtual space position information" field corresponding to the icon ID received in the processing of S91 with the virtual space position information after the movement. Accordingly, the image generation unit 37 generates the latest virtual space image using the virtual space position information that is overwritten after the movement.

S93: The transmission/reception unit 31 transmits the virtual space image generated by the image generation unit 37 to the user terminal 9a. As a result, the transmission/reception unit 91 of the user terminal 9a receives the virtual space image.

S33: In the user terminal 9a, the display control unit 94 displays on the display 518 the screen 110 on which the virtual space image representing an image after the icon y1 is moved into the association area a2 as illustrated in FIG. 28 is displayed.

S95: The communication management server 3 performs processing of associating the positions of the icons. Since this processing is described with reference to FIG. 20 in the above, the redundant description thereof is omitted. The predetermined robot is changed from the robot R1 to the robot R2 in the present example, and in the position information management table, the "belonging destination" field of the record of the user Y1 is changed from the icon ID "r21" of the robot R1 to the icon ID "r22" of the robot R2.

S96: The transmission/reception unit 31 of the communication management server 3 refers to the position information management table. Further, a voice communication session is established between three terminals, [1] the user terminal 9a for which a login ID "L21" is used [2-1] the explainer terminal 5b for which a login ID "L12" is used, and [2-2] the user terminal 9c for which a login ID "L23" is used, based on (1) the login ID "L21" of the user Y1 indicated by the icon y1 that has entered the association area a2 and (2) the login IDs "L12" and L23" that are in a record including, in the "belonging destination" field, the same icon ID as the icon ID "r22" that is included in the "belonging destination" field of another record that includes the login ID "L21." In addition, since a short-range wireless connection is established between the microphone-equipped earphone 6b and the explainer terminal 5b by the above-described processing of S11, voice communication can be performed between the microphone-equipped earphone 6b, the explainer terminal 5b, and the user terminal 9a.

S97: The transmission/reception unit 31 of the communication management server 3 refers to the position information management table. Further, a video communication session is established between the user terminal 9a for which the login ID "L21" is used and the robot R2 for which a login ID "L32" is used, based on the login ID "L21" of the user Y1 indicated by the icon y1 that has entered the association area a2 and the login ID "L32" that is in a record including, in the "belonging destination" field, the same icon ID as the icon ID "r22" that is included in the "belonging destination" field of another record that includes the login ID "L21." Thus, the robots R2 and the user terminals 9a can perform video communication with each other via the communication management server 3. For example, the robot R2 captures a video of the exhibition and transmits the video data to the user terminal 9a, and the display 518 of the user terminal 9a displays the video of the exhibition. By contrast, when the user terminal 9a captures a video including the face of the user Y1 and transmit the video data to the robot R2, the video including the face of the user Y1 is displayed on the display 518 of the robot terminal 7 of the robot R2.

When the robot R2 performs video communication with a plurality of user terminals, the robot R2 transmits the video of the exhibition to the plurality of user terminals via the communication management server 3, so that the video of the exhibition is displayed on each of the plurality of user terminals. By contrast, each communication terminal transmits video image including an image of the face of each user to the robot R2 via the communication management server 3, so that the image of the face of each user is displayed on the robot R2. Thus, the explainer E2 can explain, for example, about a product while checking the facial expression of each user.

S98: In the user terminal 9a, the transmission/reception unit 91 receives the video transmitted by the processing of S97, and as illustrated in FIG. 28, the display control unit 94 displays the video of the exhibition in the real space on the separate screen (such as a pop-up screen) 111. In the example, a scene in which the explainer E2 explains about clothing is displayed. As described above, the user Y1 can view the video of a desired part of the exhibition in the real space without going to the exhibition in the real space.

By the processing of S96, the voice communication session between the user terminal 9a and the communication management server 3 in the processing of S36 of FIG. 17 is disconnected. Further, by the processing of S97, the video communication session between the user terminal 9a and the communication management server 3 in the processing of 36 of FIG. 17 is disconnected.

As described above, the present embodiment, as illustrated in FIG. 21, allows the user Y who views at a remote site a video of an exhibition currently conducted in the real space to easily grasp a position where the video currently displayed on the user terminal 9 corresponds to in the real space.

Further, as illustrated in FIG. 1, even when a plurality of robots R1 and R2 are present in an exhibition in the real space, as illustrated in FIG. 28, the image of the separate screen 111 of FIG. 26 is immediately switched to the image of the separate screen 111 of FIG. 28 by the user Y1 moving his or her icon y1 from the periphery of the robot R1 to the periphery of the robot R2 on the virtual space image, so that it is not necessary to have the robot R1 in the real space move to a desired position.

Further, as described above, since the explainer E has a conversation with the user Y using the microphone-equipped earphone 6 without speaking to the robot R, the user Y can hear the clear voice of the explainer E without hearing the voice mixed with noise or conversations around the robot R, for example.

Figure 24:
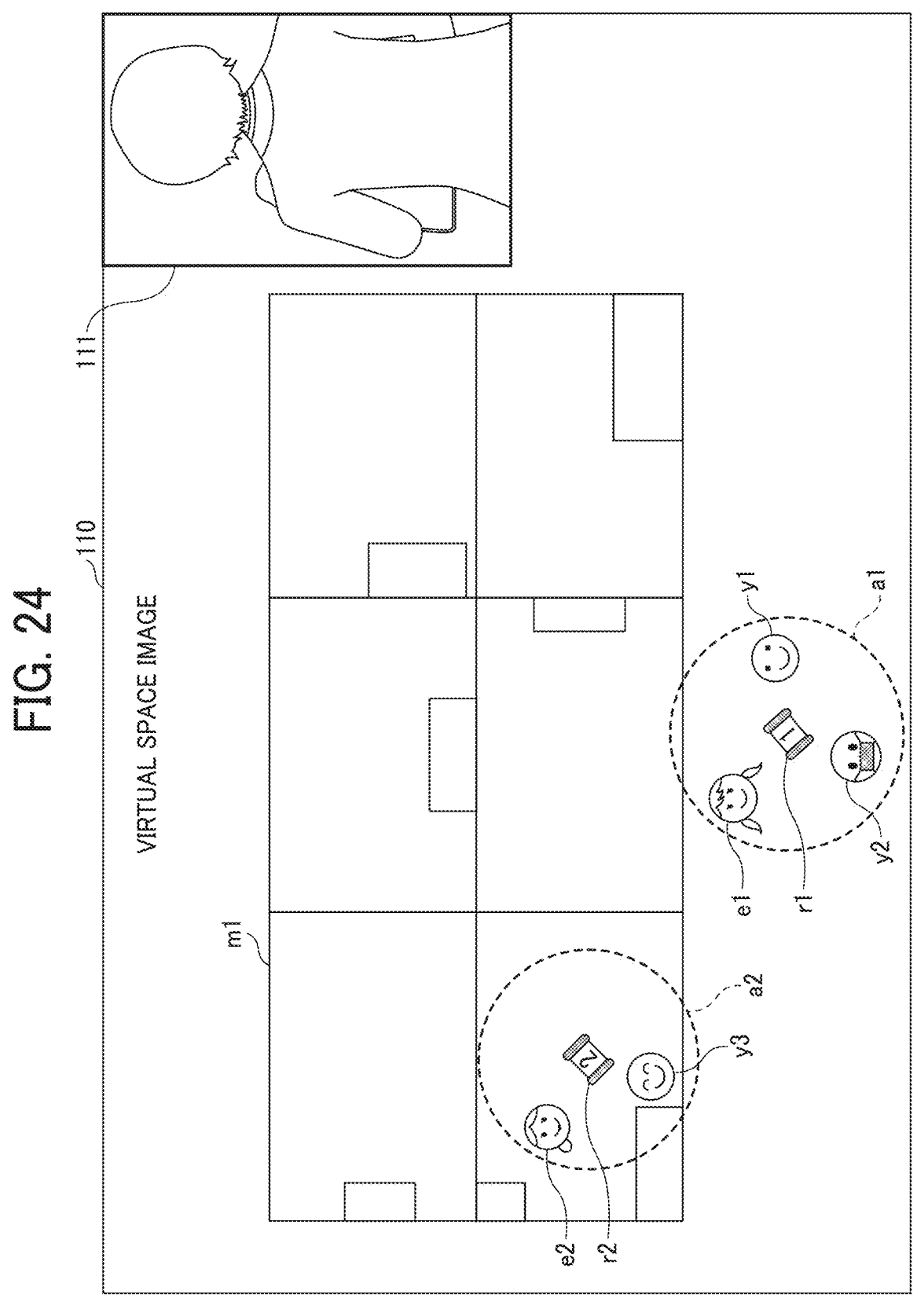
FIG. 24 is a diagram illustrating a virtual space image after the icon of the user is moved in order to associate the icon with the icon of the robot, according to the exemplary embodiment of the disclosure.

Once the icons y1 and y2 are associated with the icon r1 on the virtual space image as illustrated in FIG. 19, the icons y1 and y2 automatically follow the icon r1 according to a movement of the icon r1 as illustrated in FIG. 24, so that the user Y can keep grasping the position where the video currently displayed on the user terminal 9 corresponds to in the real space.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), a system on a chip (SOC), a graphics processing unit (GPU), and conventional circuit components arranged to perform the recited functions.

Further, any of the above-described programs may be stored in a (non-transitory) recording medium for distribution.

The number of CPU 301, 501, 811, or 1001 may be one or more.

In the case where a user remotely views a video of a real space of an exhibition in which an explainer tours together with a robot, where in the real space is currently displayed by a video is not indicated, and due to this, it has been difficult for the user to grasp the position corresponding to the video in the real space.

According to an embodiment of the present disclosure, it is possible for a user who remotely views a video of a real space such as an exhibition to easily recognize where in the real space of the video is currently displayed on a communication terminal of the user.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A communication management server, comprising circuitry configured to:

receive, from a mobile device, real space device position information indicating a position of the mobile device in a real space, the mobile device being movable in the real space and available to capture an image;

receive, from a first communication terminal being present in the real space, real space terminal position information indicating a position of the first communication terminal in the real space;

generate a virtual space image representing a virtual space, the virtual space image including an icon related to the mobile device, an icon related to the first communication terminal, and an icon related to a second communication terminal, each of the icon related to the mobile device and the icon related to the first communication terminal being associated with a corresponding position in the virtual space to appear on the virtual space image based on a corresponding one of the real space device position information and the real space terminal position information, the icon related to the mobile device and the icon related to the first communication terminal being associated with each other, the virtual space image including an association area centered around the icon related to the mobile device, the association area being visually demarcated on the virtual space image and dynamically displaying in a layout map on which the icon related to the mobile device moves based on the real space device position information indicating the position of the mobile device that moves in the real space;

transmit the virtual space image to the second communication terminal; and establish voice communication between the first communication terminal indicated by the icon related to the first communication terminal associated with the icon related to the mobile device and the second communication terminal when the second communication terminal is determined to enter the association area centered around the icon related to the mobile device on the virtual space image.

2. The communication management server of claim 1, wherein:

the circuitry is further configured to establish video communication between the mobile device and the second communication terminal in response to the second communication terminal being determined to enter the association area centered around the icon related to the mobile device.

3. The communication management server of claim 1, wherein:

the circuitry is further configured to generate the virtual space image on which the icon related to the mobile device moves based on the real space device position information indicating the position of the mobile device that moves in the real space.

4. The communication management server of claim 3, wherein:

the circuitry is further configured to generate the virtual space image on which the icon related to the second communication terminal, after being determined to have entered the association area centered around the icon related to the mobile device, moves to follow the icon related to the mobile device according to a movement of the icon related to the mobile device, the movement of the icon related to the mobile device being according to the position of the mobile device that moves in the real space.

5. The communication management server of claim 1, wherein the circuitry is further configured to:

generate the virtual space image including an icon related to a third communication terminal being present in the virtual space; and establish dedicated voice communication between one and another one of the first communication terminal, the second communication terminal, and the third communication terminal in response to receiving, via the one of the first communication terminal, the second communication terminal, and the third communication terminal, an operation of associating one and another one of the icon related to the first communication terminal, the icon related to the second communication terminal, and the icon related to the third communication terminal, on the virtual space image, the one and the another one of the icon related to the first communication terminal, the icon related to the second communication terminal, and the icon related to the third communication terminal being corresponding to the one and another one of the first communication terminal, the second communication terminal, and the third communication terminal.

6. The communication management server of claim 5, wherein:

the circuitry is further configured to establish video communication between the mobile device, the first communication terminal, and the third communication terminal in response to receiving, via the third communication terminal, an operation of associating the icon related to the third communication terminal with the icon related to the mobile device.

7. The communication management server of claim 1, wherein:

the first communication terminal performs voice communication with a voice input/output device to establish voice communication between the voice input/output device and the second communication terminal corresponding to the voice communication between the first communication terminal and the second communication terminal.

8. A communication system, comprising:

the communication management server of claim 1; and a mobile device movable in the real space and available to capture an image, the mobile device being configured to transmit, to the communication management server, the real space device position information.

9. The communication management server of claim 1, wherein:

the real space comprises an exhibition hall, and the mobile device comprises a telepresence robot to tour the exhibition hall.

10. The communication management server of claim 1, wherein:

the mobile device is configured to autonomously follow the first communication terminal in the real space.

11. The communication management server of claim 1, wherein:

the association which is visually demarcated is demarcated using a circle.

12. The communication management server of claim 11, wherein:

the circle includes broken lines.

13. The communication management server of claim 1, wherein:

the association which is visually demarcated is demarcated using a polygon.

14. A communication management server, comprising circuitry configured to:

generate a virtual space image representing a virtual space, the virtual space image including a first icon related to a first mobile device, a second icon related to a second mobile device, a third icon related to a first communication terminal, a fourth icon related to a second communication terminal, and an additional icon related to an additional communication terminal, each of the first icon, the second icon, the third icon, and the fourth icon is associated with a position in the virtual space to appear on the virtual space image according to a position of a corresponding one of the first mobile device, the second mobile device, a third communication terminal, and a fourth communication terminal in a real space, each of the first mobile device and the second mobile device being movable in the real space and available to capture an image, wherein the first icon is associated with the third icon, and the second icon is associated with the fourth icon, the virtual space image includes a first association area centered around the first icon and a second association area centered around the second icon, and the first association area and the second association area are each visually demarcated on the virtual space image and dynamically displaying in a layout map on which the icon related to the mobile device moves based on the real space device position information indicating the position of the mobile device that moves in the real space;

establish voice communication between the first communication terminal and the additional communication terminal when the additional communication terminal is determined to be within the first association area centered around the first icon;

transmit the virtual space image to the additional communication terminal; and disconnect the voice communication between the first communication terminal and the additional communication terminal to establish different voice communication between the second communication terminal and the additional communication terminal in response to receiving, via the additional communication terminal, an operation of moving the additional icon from the first association area centered around the first icon to the second association area centered around the second icon on the virtual space image.

15. The communication management server of claim 14, wherein:

in a case that the operation of moving the additional icon from the first association area centered around the first icon to the second association area centered around the second icon on the virtual space image is received via the additional communication terminal after video communication is established between the first mobile device and the additional communication terminal, the circuitry is further configured to disconnect the video communication between the first mobile device and the additional communication terminal to establish different video communication between the second communication terminal and the additional communication terminal.

16. The communication management server of claim 14, wherein:

the circuitry is further configured to:

generate the virtual space image on which the first icon moves according to a position of the first mobile device that moves in the real space and the additional icon moves to follow the first icon; and generate the virtual space image on which the additional icon ends following the first icon to move and follow the second icon in response to receiving, via the additional communication terminal, the operation of moving the additional icon from the first association area centered around the first icon to the second association area centered around the second icon on the virtual space image.

17. A communication system, comprising:

the communication management server of claim 14;

a first mobile device movable in the real space and available to capture an image; and a second mobile device movable in the real space and available to capture an image, the second mobile device being different from the first mobile device.

18. A method for managing communication, comprising:

receiving, from a mobile device, real space device position information indicating a position of the mobile device in a real space, the mobile device being movable in the real space and available to capture an image;

receiving, from a first communication terminal being present in the real space, real space terminal position information indicating a position of the first communication terminal in the real space;

generating a virtual space image representing a virtual space, the virtual space image including an icon related to the mobile device, an icon related to the first communication terminal, and an icon related to a second communication terminal, each of the icon related to the mobile device and the icon related to the first communication terminal being associated with a corresponding position in the virtual space to appear on the virtual space image based on a corresponding one of the real space device position information and the real space terminal position information, wherein the icon related to the mobile device and the icon related to the first communication terminal are associated with each other, the virtual space image including an association area centered around the icon related to the mobile device, wherein the association area is visually demarcated on the virtual space image and dynamically displaying in a layout map on which the icon related to the mobile device moves based on the real space device position information indicating the position of the mobile device that moves in the real space;

transmitting the virtual space image to the second communication terminal; and establishing voice communication between the first communication terminal, the first communication terminal indicated by the icon related to the first communication terminal associated with the icon related to the mobile device, and the second communication terminal when the second communication terminal is determined to enter the association area.

19. A method for managing communication, comprising:

generating a virtual space image representing a virtual space, the virtual space image including a first icon related to a first mobile device, a second icon related to a second mobile device, a third icon related to a first communication terminal, a fourth icon related to a second communication terminal, and an additional icon related to an additional communication terminal, each of the first icon, the second icon, the third icon, and the fourth icon is associated with a position in the virtual space to appear on the virtual space image according to a position of each of the first mobile device, the second mobile device, the third communication terminal, and the fourth communication terminal in a real space, each of the first mobile device and the second mobile device being movable in the real space and available to capture an image, wherein the first icon is associated with the third icon, and the second icon is associated with the fourth icon, the virtual space image including a first association area centered around the first icon and a second association area centered around the second icon, the first association area and the second association area being each visually demarcated on the virtual space image and dynamically displaying in a layout map on which the icon related to the mobile device moves based on the real space device position information indicating the position of the mobile device that moves in the real space;

establishing voice communication between the first communication terminal and the additional communication terminal when the additional communication terminal is determined to be within the first association area centered around the first icon;

transmitting the virtual space image to the additional communication terminal; and disconnecting the voice communication between the first communication terminal and the additional communication terminal to establish different voice communication between the second communication terminal and the additional communication terminal in response to receiving, via the additional communication terminal, an operation of moving the additional icon from the first association area centered around the first icon to a second association area centered around the second icon on the virtual space image.

\* \* \* \* \*